US008369272B2

(12) United States Patent
Barbaresi et al.

(10) Patent No.: US 8,369,272 B2
(45) Date of Patent: Feb. 5, 2013

(54) APPARATUS AND METHOD FOR IMPLEMENTING CONFIGURABLE RESOURCE MANAGEMENT POLICIES

(75) Inventors: Andrea Barbaresi, Turin (IT); Sergio Barberis, Turin (IT); Robert Farotto, Turin (IT); Marco Tosalli, Turin (IT)

(73) Assignee: Telecom Italia S.p.A., Milan (IT)

( * ) Notice: Subject to any disclaimer, the term of this patent is extended or adjusted under 35 U.S.C. 154(b) by 956 days.

(21) Appl. No.: 12/311,323

(22) PCT Filed: Sep. 27, 2006

(86) PCT No.: PCT/EP2006/009384
§ 371 (c)(1),
(2), (4) Date: Mar. 26, 2009

(87) PCT Pub. No.: WO2008/037277
PCT Pub. Date: Apr. 3, 2008

(65) Prior Publication Data
US 2010/0029290 A1 Feb. 4, 2010

(51) Int. Cl.
*H04W 4/00* (2009.01)
(52) U.S. Cl. .................. 370/329; 455/452.1
(58) Field of Classification Search .............. None
See application file for complete search history.

(56) References Cited

U.S. PATENT DOCUMENTS

| 2004/0181476 | A1 | 9/2004 | Smith et al. | |
|---|---|---|---|---|
| 2004/0252666 | A1* | 12/2004 | Johnson | 370/335 |
| 2005/0026616 | A1 | 2/2005 | Cavalli et al. | |
| 2005/0073977 | A1* | 4/2005 | Vanghi et al. | 370/335 |
| 2006/0123253 | A1* | 6/2006 | Morgan et al. | 713/300 |
| 2006/0254615 | A1* | 11/2006 | Kevwitch | 134/2 |
| 2007/0253365 | A1* | 11/2007 | Hedberg et al. | 370/329 |

FOREIGN PATENT DOCUMENTS

| WO | WO 2005/101880 A1 | 10/2005 |
|---|---|---|
| WO | WO 2005/101889 A1 | 10/2005 |

OTHER PUBLICATIONS

Chandra et al.; "Darwin: Customizable Resource Management for Value-Added Network Services", IEEE Comput. Soc. US., pp. 177-188, (1998).

(Continued)

*Primary Examiner* — Jianye Wu
(74) *Attorney, Agent, or Firm* — Finnegan, Henderson, Farabow, Garrett & Dunner, L.L.P.

(57) ABSTRACT

A resource management apparatus adapted to implement resource management policies for the management of resources of a system, being susceptible of being assigned to entities requesting services to the system. The resource management apparatus includes: a configuration interface adapted to receive resource management configuration data from a user, the configuration data including a resource management decision logic adapted to specify a resource management policy; a resource management policy implementation unit responsive to service requests from the requesting entities and adapted to manage the assignment of the resources of the system to the requesting entities based on the resource management decision logic. The configuration interface is adapted to receive, and the resource management policy implementation unit is adapted to manage resource management decision logic structured as a set of one or more decision rules, each decision rule including: a description of at least one service request intended to be governed by the decision rule; a description of a state of the system in respect of which the decision rule is intended to apply; and action to be taken by the apparatus in case the decision rule applies.

19 Claims, 12 Drawing Sheets

OTHER PUBLICATIONS

Agrawal et al.; "Policy Management for Networked Systems and Applications", 9th IFIP/IEEE International Symposium, pp. 455-468, (2005).

Casadevall et al.; "Overview of the Everest Project", 13TH IST Mobile & Wireless Communications Summit, XP-002445461, pp. 1-5, (2004).

International Search Report mailed on Aug. 17, 2007, in international application No. PCT/EP2006/009384.

3rd Generation Partnership Project; Technical Specification Group Radio Access Network; "Improvement of RRM across RNS and RNS/BSS", (Release 5), 3GPP TR 25.881 V5.0.0, pp. 1-44, (2001).

3rd Generation Partnership Project; Technical Specification Group Radio Access Network; "Improvement of RRM across RNS and RNS/BSS (Post Rel-5)", (Release 6), 3GPP TR 25.891 V0.3.0, pp. 1-17, (2003).

3rd Generation Partnership Project; Technical Specification Group Services and System Aspects; "3GPP system to Wireless Local Area Network (WLAN) Interworking; Functional and architectural definition", (Release 6), 3GPP TR 23.934 V1.0.0, pp. 1-37, (2002).

Broadband Radio Access Networks (BRAN); HIPERLAN Type 2; "Requirements and Architectures for Interworking between HIPERLAN/2 and 3rd Generation Cellular systems", ETSI TR 101 957 V1.1.1, pp. 1-56, (2001).

3rd Generation Partnership Project; Technical Specification Group Radio Access Network; "User Equipment (UE) procedures in idle mode and procedures for cell reselection in connected mode", (Release 7), 3GPP TS 25.304 V7.0.0), pp. 1-38, (2006).

3GPP TS 25.331 V5.17.0, pp. 1-1045, (2006).

3rd Generation Partnership Project; Technical Specification Group Radio Access Network; "UTRAN Iur interface Radio Network Subsystem Application Part (RNSAP) signaling", (Release 6), 3GPP TS 25.423 V6.10.0, pp. 1-688, (2006).

3rd Generation Partnership Project; Technical Specification Group Radio Access Network; "Physical layer-Measurements (FDD)", (Release 7), 3GPP TE 25.215 V7.0.0, pp. 1-18, (2006).

3rd Generation Partnership Project; Technical Specification Group GSM/EDGE Radio Access Network; "Mobile radio interface layer 3 specification; Radio Resource Control Protocol" (Release 1999), 3GPP TS 04.18 V8.27.0, pp. 1-315, (2006).

3rd Generation Partnership Project; Technical Specification Group Radio Access Network; "Physical layer procedures (FDD)", (Release 7) 3GPP TS 25.214 V7.1.0, pp. 1-59, (2006).

3rd Generation Partnership Project; Technical Specification Group Services and System Aspects; "Quality of Service (QoS) concept and architecture", (Release 6), 3GPP TS 23.107 V6.4.0, pp. 1-40, (2006).

3rd Generation Partnership Project; Technical Specification Group GSM/EDGE Radio Access Network; "Radio subsystem link control", (Release 1999), 3GPP TS 05.08 V8.23.0, pp. 1-100, (2005).

* cited by examiner

FIG. 6

Table with identifier IDt=7

| | Expr | s | type | origin | ... | dest(1) | ... | dest(Npmax) |
|---|---|---|---|---|---|---|---|---|
| RWP1 | <expr₁> | 1 | 0 | 6 | | T | | T |
| RWP2 | <expr₂> | 1 | 1 | * | | T | | * |
| RWP3 | <expr₃> | 3 | * | 3 | | * | | F |
| RWPm | ... | | | | | | | |

601 — Table with identifier IDt=7
610 — Event
605

| State of the origin cell | | | | Counters of the origin cell | | | Pool | State of pool's cell | | | | Counters of pool's cell | | | Action |
|---|---|---|---|---|---|---|---|---|---|---|---|---|---|---|---|
| RTLU | RTLD | N₁ | ... | N_Ns | c₁ | ... | c_Nc | | RTLU | RTLD | N₁ | ... | N_Ns | c₁ | ... | c_Nc | |
| <30 | * | 90 | | <40 | [5,120] | | [1.4.1.8] | 3 | <20 | * | 60 | | <30 | [5,150] | | [1.4.4.8] | 3 |
| >=48 | >88 | >20 | | >20 | * | | <4.7 | 4 | >48 | <88 | <50 | | <30 | * | | <7.7 | 4 |
| [30,68] | <13 | * | | * | >12 | | >7.4 | | [3,6] | <=13 | * | | * | >12 | | * | Rej |

621 — State of the origin cell
622 — Counters of the origin cell
640 — Pool
651 — State of pool's cell
652 — Counters of pool's cell
690 — Action 465-p

APPARATUS AND METHOD FOR IMPLEMENTING CONFIGURABLE RESOURCE MANAGEMENT POLICIES

CROSS REFERENCE TO RELATED APPLICATION

This application is a national phase application based on PCT/EP2006/009384, filed Sep. 27, 2006, the content of which is incorporated herein by reference.

BACKGROUND OF THE INVENTION

1. Field of the Invention

The present invention generally relates to the management of system's resources to be assigned to entities requesting services from the system. In particular, albeit not limitatively, the invention relates to the management of resources, particularly radio resources, in radio communications systems like mobile telephony networks. Specifically, the invention concerns an apparatus for implementing configurable policies of resource management.

2. Description of Related Art

In the field of radio communications networks, several different technologies and several different standards coexist. The radio communications networks of the second generation (so-called "2G" networks, like those complying with the standard GSM—Global System for Mobile communications), which nowadays are the most broadly deployed, and are mostly suited for enabling voice communications, will in the coming years go more and more side by side with radio communications networks of new generation, such as third-generation ("3G") networks (like those complying with the standard UMTS—Universal Mobile Telecommunications System) and fourth-generation networks (still in the course of being standardized), designed for supporting, in addition to plain voice communications, data exchange and multimedia (e.g., video telephony, television broadcasting and similar) services, as well as broadband data communications networks of the Wireless LAN (WLAN) type.

A common approach in network deployment is not to completely replace 2G networks already in operation with new-generation networks, rather to integrate the different types of networks. The integration between radio communications networks of new generation with 2G networks is made possible by the new network standards, which are specifically defined in such a way to enable the networks integration. For example, in the 3GPP (Third Generation Partnership Project) specifications, that set forth the characteristics of the UMTS, several procedures are defined enabling the interoperation ("interworking") with GSM networks (all the 3GPP specification documents cited in this description can be downloaded from the Internet site www.3GPP.org). In particular, in the 3GPP Technical Report (TR) 25.881 titled "Improvement of RRM across RNS and RNS/BSS, Release 5", and in the 3GPP TR 25.891 titled "Improvement of RRM across RNS and RNS/BSS, Release 6" functional models and network architectures are defined where Common Radio Resource Management (CRRM) policies can be applied.

A known market trend is that of using, in certain geographic areas referred to as "hot spots", WLAN technologies, so as to enable users that happen to be located in those areas to enjoy a broadband access to a number of data communications services like Internet access. WLAN technologies can also be integrated within a mobile telephony network, particularly in the access network segment. For this reason, interoperation mechanisms are also being defined that enable WLAN technologies (e.g., complying with the IEEE 802.11 family of standards, or with the ETSI standard known as HIPERLAN2) to intemperate with 3G mobile telephony networks so as to enable access to the transport network thereof. For example, the 3GPP TR 23.934, titled "3GPP system to Wireless Local Area Network (WLAN) interworking functional and architectural definition, Release 6" specifies the functional requirements to be satisfied by those network architectures that include IEEE 802.11 WLAN accesses in the UMTS network. Similarly, the ETSI TR 101.957, tiled "Broadband Radio Access Networks (BRAN): HIPERLAN Type 2; Requirements and architectures for interworking between HIPERLAN/2 and $3^{rd}$ generation cellular systems", specifies the interoperation mechanisms of HIPERLAN2 WLANs with the UMTS network.

Radio communications systems integrating two or more Radio Access Technologies are referred to as "multi-RAT" systems.

So-called "multi-mode" mobile telecommunications terminals are already available on the market (like cellular phones, palmtops, Personal Digital Assistants—PDAs—, peripheral cards for Personal Computers—PCs, etc.) which can connect to networks complying with different standards, like the GSM, the UMTS, IEEE 802.11b/g/a WLAN. For example, dual-mode mobile phones can work both in GSM and in UMTS systems.

In the International applications WO 2005/101880 and WO 2005/101889, solutions are proposed to the problem of the decisions to be taken by the network as to which type of radio access is to be assigned to incoming service requests.

The U.S. published patent application US 2005/0026616, titled "Common radio resource management method in a multi-RAT cellular telephone network", describes which information has to be exchanged between the different system entities to enable an efficient CRRM policy.

Generally, CRRM policies are implemented by means of CRRM algorithms that run on specific network equipment, like for example the Radio Network Controllers (RNCS) of a UMTS network, or the Base Station Controllers (BSCS) of a GSM network, and that, upon receiving service requests from users, allocate them on the better pool of radio communications resources, depending on a number of factors like the nature of the requested service, the load status of the network at the time the service request is received, the overall radio resources available.

SUMMARY OF THE INVENTION

The Applicant has observed that every network operator may be interested in designing its own CRRM algorithms, implementing proprietary CRRM policies that best fit that network operator's needs and desires. However, current implementations of CRRM policies do not allow or at least disfavor this kind of approach.

Indeed, the standards are essentially silent about the implementation details of CRRM algorithms, so every manufacturer of network equipment has developed its own CRRM algorithms. Thus, presently a network operator wishing to define and implement specific, custom CRRM algorithms has to ask the network equipment manufacturer to customize the network equipment: this has an impact on network equipment costs. Also, CRRM policies may vary in time, to match changes in the network configuration, or in the service requests coming from users; also in these cases, the network operator cannot do anything but ask the network equipment manufacturer to update the CRRM algorithms implemented.

Thus, the current implementation of CRRM policies is rather rigid.

The Applicant has thus tackled the problem of how to make the implementation of CRRM policies more flexible, at least from the network operator viewpoint.

The Applicant has found that by separating the hardware/software implementation of the network equipment from the CRRM algorithms that have to be implemented and executed by them, it is possible for the network operator to design and directly implement custom-defined CRRM algorithms, as well as to modify them when needed or desired, without the need to redesign the network equipment, i.e., without the need of any intervention of the network equipment manufacturer.

Essentially, the present invention sets forth an apparatus which, as far as the resource management policies are concerned, is configurable by, e.g., the network operator; thanks to the present invention, the network operator is thus left free to configure the equipment governing the operation of its system (e.g., network equipment like the BSCs, the RNCs, or other devices that govern the operation of radio communications networks, particularly of multi-RAT type) so as to choose, define, implement, and possibly vary after implementation the desired algorithms for managing the resources of the system, e.g. radio resources of a multi-RAT system, and the policy of assignment of such system resources to requesting entities, like users of mobile communications terminals.

According to an aspect of the present invention, there is provided a resource management apparatus adapted to implement resource management policies for the management of resources of a system, said resources being susceptible of being assigned to entities requesting services to the system. The resource management apparatus comprises:

a configuration interface adapted to receive resource management configuration data from a user, said configuration data including a resource management decision logic adapted to specify a resource management policy;

a resource management policy implementation unit responsive to service requests from the requesting entities and adapted to manage the assignment of the resources of the system to the requesting entities based on the resource management decision logic, wherein said configuration interface is adapted to receive, and said resource management policy implementation unit is adapted to manage resource management decision logics structured as a set of one or more decision rules, each decision rule comprising:

a description of at least one service request intended to be governed by said decision rule;

a description of a state of the system in respect of which the decision rule is intended to apply; and an action to be taken by the apparatus in case the decision rule applies.

In preferred features of the apparatus of the present invention, said configuration data may include a definition of at least two groups of the resources of the system;

wherein said configuration data may include a definition of types of service requests in respect of which the assignment of system's resources belonging to either one of the at least two groups of resources of the system has to be managed by the apparatus;

wherein said action to be taken by the apparatus in case the respective decision rule applies may include an indication of whether a service request has to be assigned a system's resource belonging to one or the other of the at least two groups, or it has to be rejected;

wherein said description of at least one service request may include an indication of the type of the requested service, an indication of the group of system's resources to which the system resource through which the service request is received belongs, an indication of the possibility of re-allocating the service request on another group of system's resources of said at least two groups; and wherein the resource management policy implementation unit may be adapted to manage the assignment of the resources of the system in response to a received service request based on a comparison between a description of the received service request and the descriptions of the service requests included in the at least one decision rule of a resource management decision logic received through said configuration interface.

In other preferred features of the apparatus of the present invention, the resource management policy implementation unit may be adapted to manage the assignment of the resources of the system in response to a received service request based on a comparison between a description of a current state of the system at the time the service request is received and the descriptions of the state of the system included in the at least one decision rule of a resource management decision logic received through the configuration interface; or said description of a state of the system in respect of which the decision rule is intended to apply may include at least one count value of events corresponding to received service requests;

wherein said configuration data may include a definition of at least one event counter to be associated with specified events corresponding to service requests from the requesting entities, said at least one event counter being managed by the resource management policy implementation unit; and wherein the resource management policy implementation unit may be adapted to manage the assignment of the resources of the system in response to a received service request based on a comparison between a current value of the at least one event counter and a count value specified in the description of the state of the system included in the at least one decision rule.

In still other features of the apparatus of the present invention, said configuration data may include at least one table of values, the at least one decision rule of a resource management decision logic received through the configuration interface including references to the said at least one table, said resource management policy implementation unit being adapted to look-up to the at least one table based on the references included in the at least one rule of the resource management decision logic; or said system may be a telecommunication-system, and said resources may be telecommunication resources;

wherein said telecommunication system may include a radio access technology radio communication system;

wherein said radio access technology radio communication system may be structured in cells, and said descriptions of a state of the system may include an indication of load of said cells;

wherein said indication of cell load may include:

an indication of cell load in uplink for real-time services related to the generic one of the cells;

an indication of cell load in downlink for real-time services related to the generic one of the cells;

an indication of a number of active connections for the generic service related to the generic one of the cells;

wherein said at least two groups of system resources may be groups of cells;

wherein said configuration data may include; for each of said cells, a definition of a list of other cells in overlap thereto and belonging to a different group of system resources;

wherein said configuration data may include, for each of said cells, an indication of a modality of determination of an admissible alternative system's resource susceptible of being used for satisfying the service request;

wherein said indication of modality may include an indication of whether the determination has to be based on radio measures performed by the requesting entities; and wherein said description of at least one service request may include an indication of the type of the service request, said type of service request may include an indication of whether it is a new request or a hand-over.

According to another aspect of the present invention, there is provided a method of implementing resource management policies for the management of resources of a system, susceptible of being assigned to entities requesting services to the system.

The method comprises:
providing to a resource management apparatus, through a configuration interface thereof, resource management configuration data, said configuration data including a resource management decision logic adapted to specify a resource management policy;

having the resource management apparatus manage the assignment of the resources of the system to the requesting entities in response to received service requests based on the resource management decision logic;

wherein said resource management decision logics is structured as a set of one or more decision rules, each decision rule comprising:

a description of at least one service request intended to be governed by said decision rule;

a description of a state of the system in respect of which the decision rule is intended to apply; and an action to be taken by the apparatus in case the decision rule applies.

A decision logic structured as (a) set(s) of one or more decision rules ensures a high degree of flexibility. The decision rules are freely definable by the user, e.g. the network operator, simply respecting a predetermined syntax. Thus, it is relatively easy to build several different decision logics, defining different rules, so as to implement differentiated resource management policies.

BRIEF DESCRIPTION OF THE DRAWINGS

The features and advantages of the present invention will be made apparent by reading the following detailed description of an embodiment thereof, provided merely by way on non-limitative example, description that will be conducted making reference for better clarity to the attached drawings, wherein:

FIG. 6 schematically shows another illustrative table of the set of tables implementing the rules of a CRRM decision logic, in an embodiment of the present invention;

DETAILED DESCRIPTION OF THE PREFERRED EMBODIMENT(S) OF THE INVENTION

Figure 1:
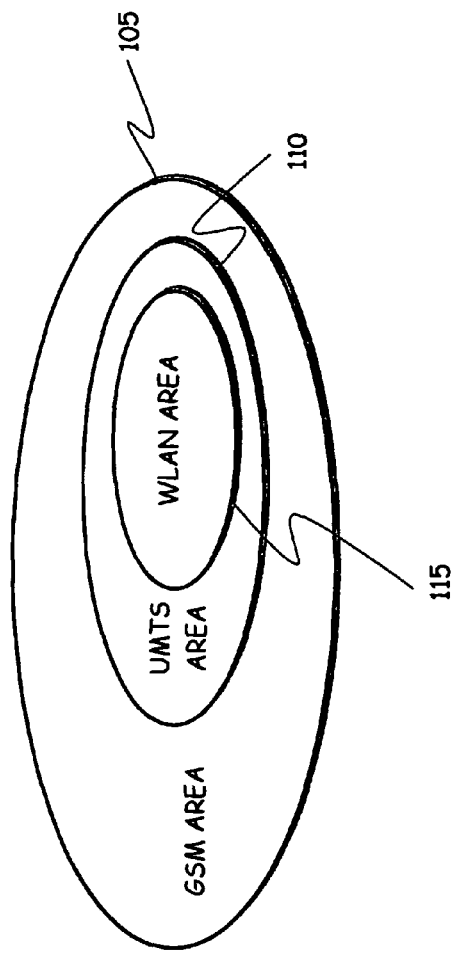
FIG. 1 schematically shows an illustrative scenario wherein the present invention is applicable.

In the following of the present description, reference will be made, merely by way of non-limitative example, to the currently known types of radio communications networks, namely the GSM, the GPRS (General Packet Radio Service), the EDGE (Enhanced Data rate for GSM Evolution), the UMTS (Universal Mobile Telecommunications System), the WLAN, and to CRRM algorithms that are used for the interworking and the cooperation of such networks. However, it will be appreciated that the present invention has a more general applicability.

According to the present invention, the apparatuses that implement resource management policies are adapted to enable the definition of categories of resources to be managed; such categories are hereinafter referred to as "pools" of resources. In general, for the purposes of the present invention, a pool of resources is a set of one or more resources belonging to the considered system, which may have homogeneous properties (the specific property(ies) may vary according to the network operator's needs), or simply that, for some reason, the network operator wants to consider as homogeneous In the example considered in the present description, the following pools of network (radio) resources are identified (this subdivision in categories is merely illustrative: different subdivisions may be considered):

radio resources belonging to the different RATs, e.g. GERAN (GPRS/EDGE Radio Access Network) radio resources, UTRAN (UMTS Terrestrial Radio Access Network) radio resources, BRAN (Broadband Radio Access Network)/WLAN radio resources;

radio resources belonging to different Hierarchical Cellular Structures (HCSs), like for example a macro-cellular layer and a micro-cellular layer that share a same carrier within the UTRAN;

radio resources belonging to different frequency layers (e.g., the 900 MHz and the 1800 MHz layers in GSM); and UTRAN radio resources based on different modalities and techniques, like for example radio resources of the UTRAN according to the Release 99 of the standard, and radio resources based on the HSDPA (High Speed Downlink Packet Access) Release 5.

For each of the above-listed illustrative pools of resources, specific interworking mechanisms are defined by the standards, that enable the integrated management thereof; examples of such mechanisms are:

- inter-RAT or inter-frequency camping mechanisms, that are implemented at the radio communications terminal level and that allow the terminal initially selecting a cell among those belonging to different RATs or different frequencies (these mechanisms are for example specified in the 3GPP TS 25.304);
- inter-RAT or inter-frequency cell reselection mechanisms, that are implemented at the radio communications terminal level and that allow the terminal selecting a cell from those belonging to different RATs or different frequencies (as specified in the cited 3GPP TS 25.304);
- inter-RAT directed retry mechanisms, which relate to a procedure controlled by the network for moving the signaling channels used by a generic user from the GSM network to the UMTS network, or vice versa (as specified in the 3GPP TS 25.331);
- inter-RAT handover mechanisms, which relate to a procedure controlled by the network for moving a call of a generic user from the GSM network to the UMTS network, or vice-versa (as specified in the above cited 3GPP TS 25.331);
- common measurement mechanisms, which relate to a procedure for the exchange of cell load values between the RNC and the BSC (as specified in the 3GPP TS 25.423);
- inter-frequency directed retry mechanisms, which relate to a procedure controlled by the network for moving the signaling channels used by a generic user from a frequency of the UTRAN to another, different UTRAN frequency (as specified in the 3GPP TS 25.331); and
- inter-frequency handover mechanisms, which relate to a procedure controlled by the network for moving a call of a generic user from a UTRAN frequency to another UTRAN frequency (as specified in the 3GPP TS25.331).

Among the CRRM algorithms that are directed to the joint and synergic management of the radio resources belonging to different pools of resources, like the pools of resources listed above, those algorithms that allocate traffic based on service requests from the users are particularly important. These algorithms allow the network traffic steering onto different pools of resources, depending on the network operator's preferences (reduction of costs, increase of the quality of service perceived by the users, revenues maximization, etc.).

FIG. 1 depicts a possible scenario wherein the present invention can be applied. A geographic area of interest, denoted 105, is assumed to be served by a GSM network; a portion 110 of the area 105 is assumed to be also served by a UMTS network (thus, the area 110 is served by both the GSM network and the UMTS network); in a portion 115 of the area 110, coverage by a WLAN network is also assumed to exist. This scenario, albeit not limitative for the present invention, is rather true-to-reality, because it assumes that the GSM networks (or other 2G networks), nowadays largely diffused, in some areas (e.g., in urban areas, or along motorways) work side-by-side with UMTS networks (or other 3G networks), which are currently not as broadly deployed as 2G networks, and furthermore that, in limited portions of the territory (e.g., within hotels, or service stations along the motorways), WLAN hot-spots are present that enable a broadband connection to, e.g., the Internet (the fact that, in the considered scenario, the hot-spots 115 are contained within the area 110 covered by the UMTS is not to be considered limitative, but it is nonetheless a reasonable assumption, because WLAN hot-spots are usually placed in areas characterized by a high concentration of users with low mobility requiring broadband data communications services).

Figure 2:
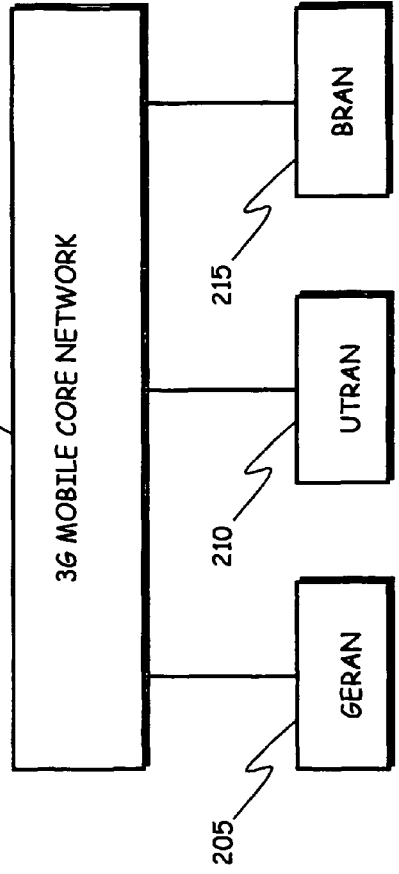
FIG. 2 schematically shows, in terms of functional blocks, the structure of an illustrative, multi-RAT communications network reflecting the scenario of FIG. 1.

FIG. 2 schematically shows, in terms of functional blocks, the structure of an illustrative, multi-RAT communications network reflecting the scenario of FIG. 1. The multi-RAT network comprises in particular a GERAN 205, used by GSM/GPRS/EDGE terminals for accessing the network, a UTRAN 210, used by UMTS terminals for accessing the network, and a BRAN 215 used by WLAN terminals for accessing the network. A 3G core network 220 forms the transport segment of the multi-RAT network.

Figure 3:
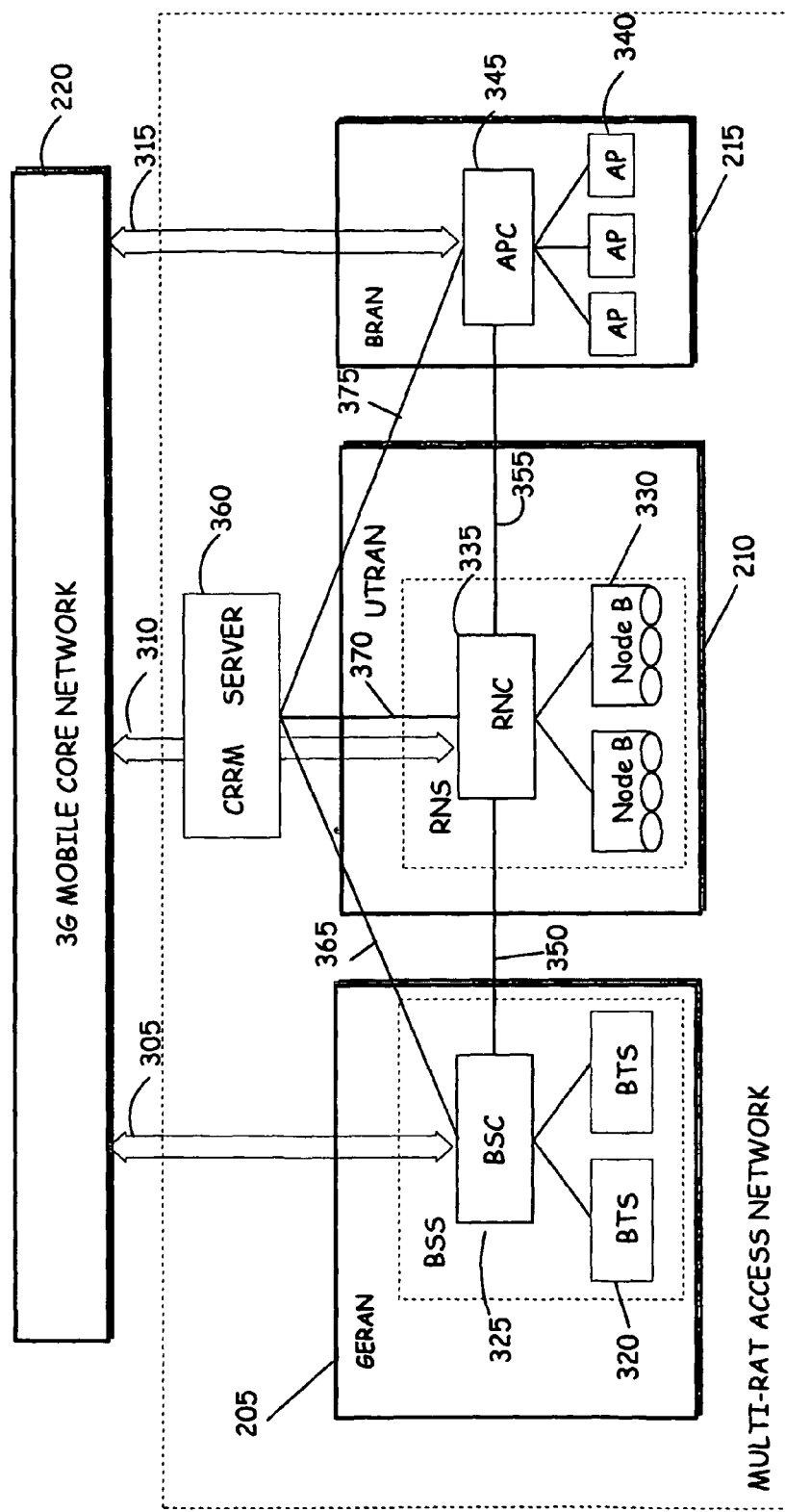
FIG. 3 schematically shows, still in terms of functional blocks but in greater detail, an architecture of the multi-RAT network of FIG. 2.

The network architecture in FIG. 2 is shown in greater detail in FIG. 3; the core network 220 is connected to the GERAN 205 through an interface 305, for example the interface called "A" interface or "Gb" interface, depending on the core network domain, to the UTRAN 210 through an interface 310, for example corresponding to the "Iu" interface, and to the BRAN 215 through an interface 315 (for example, the interface sometimes referred to as the "Iu-like" interface).

The GERAN 205 comprises, in a way per-se known in the art, Base Station Subsystems (BSS), including Base Transceiver Stations (BTSs) 320 and BSCs 325. The UTRAN comprises, also in a way per-se known in the art, Radio Network Subsystems (RNS), including Node-Bs 330 and RNCs 335. The BRAN 215 comprises, still in a way per-se known in the art, Access Points (APs) 340 and Access Points Controllers (APCs) 345.

The BSCs 325, the RNCs 335 and the APCs 345 may exchange information through the core network 220, or, when suitable interfaces 350 (corresponding to the "Iur-g" interface) and 355 (also referred to as the "Iur-like" interface) are provided, they can communicate directly with each other.

CRRM algorithms can for example reside and be executed by the BSCs 325, the RNCs 335 and the APCs 345. Alternatively, a network entity, denoted 360 in the drawing and hereinafter referred to as "CRRM server" may be provided, dedicated to the common, integrated management of the resources of the multi-RAT network. The CRRM server 360 may be connected to the BSCs 325 through an interface 365, to the RNCs 335 through an interface 370, and to the APCs through an interface 375. The CRRM server 360 may request to the BSCs 325 information about the state of the GSM network cells, as well as it may request to the RNCs 335 information about the state of the UMTS network cells; similarly, the CRRM server may request to the APCs 345 information about the state of the WLAN hot-spots.

Based on the specific nature, any service supported by the multi-RAT network may be allocated on one or more radio access networks; for example, a voice communication service may be offered through either the GSM or the UMTS network, whereas a specific data exchange service (e.g. a video-call) can only be provided through the UMTS network or the WLAN. The CRRM algorithms that run in the BSCs 325, the RNCs 335 and the APCs 345, or, alternatively, in the CRRM server 360 determine, based on the current state of the network, whether or not to accept service requests from the users, and which radio access network to use for providing the service, if the latter is accepted.

According to an embodiment of the present invention, a network operator can, without redesigning the BSCs 325, the RNCs 335 and the APCs 345, or, alternatively, of the CRRM server 360, configure these network apparatuses so that they implement custom-defined CRRM algorithms. Non-limitative embodiments of the invention will be described in detail hereinafter.

Existing standards prescribe that, for each cell of the GSM and UMTS networks, it is possible to define different types of lists of adjacent cells; these lists are typically used in a phase of setting of the radio measurements that the mobile communications terminals can perform, e.g. for evaluating the opportunity of passing from one cell to another in order to get a better coverage (see for example 3GPP TS 25.215).

For example, according to the 3GPP TS 25.331, to each cell of the UTRAN the following adjacency lists are associated:

list of intra-frequency adjacencies, i.e. the list of the cells of the UTRAN that are adjacent to the considered UTRAN cell and that use the same carrier frequency;

list of inter-frequency adjacencies, i.e. the list of the cells of the UTRAN that are adjacent to the considered UTRAN cell and that use different carrier frequencies;

list of GSM inter-RAT adjacencies, i.e. the list of the cells of the GSM (GERAN) network that are adjacent to the considered UTRAN cell.

According to the 3GPP TS 04.18, to each cell of the GSM (GERAN) the following adjacency lists are associated:

list of GSM neighbor cells, containing the list of cells of the GSM (GERAN) network adjacent to the GSM (GERAN) cell to which the mobile terminal is camped;

list of 3G neighbor cells, containing a list of cells of the UMTS network adjacent to the GSM (GERAN) cell to which the mobile terminal is camped.

The 3GPP specification (3GPP TS 25.214) prescribes that the mobile terminal measures the radio quality of the pilot signal transmitted by the cells that are adjacent to the cell to which the terminal is camped.

The 3GPP specifications also set forth several modalities for making the BSCs and the RNCs aware of the functional characteristics of the mobile terminals (referred to as "terminal capabilities").

For example, the UMTS network can get the functional characteristics of the terminal when the RRC (Radio Resource Control) connection is being set up: when a terminal establishes the connection with the network, a user context can be created within the RNC, where the information related to the terminal capabilities are stored.

In the GERAN, the request of the terminal capabilities can take place by means of a message called "CLASSMARK ENQUIRY" (as specified in the 3GPP TS 04.18); in the case of a multi-RAT terminal, the mobile terminal provides to the GERAN also the capabilities related to the UTRAN.

The above information can be used by the CRRM algorithms to take the most appropriate decisions according to the terminal capabilities. The pools of resources that a terminal can use, in fact, depend both on radio coverage and on the terminal capabilities.

Figure 4A:
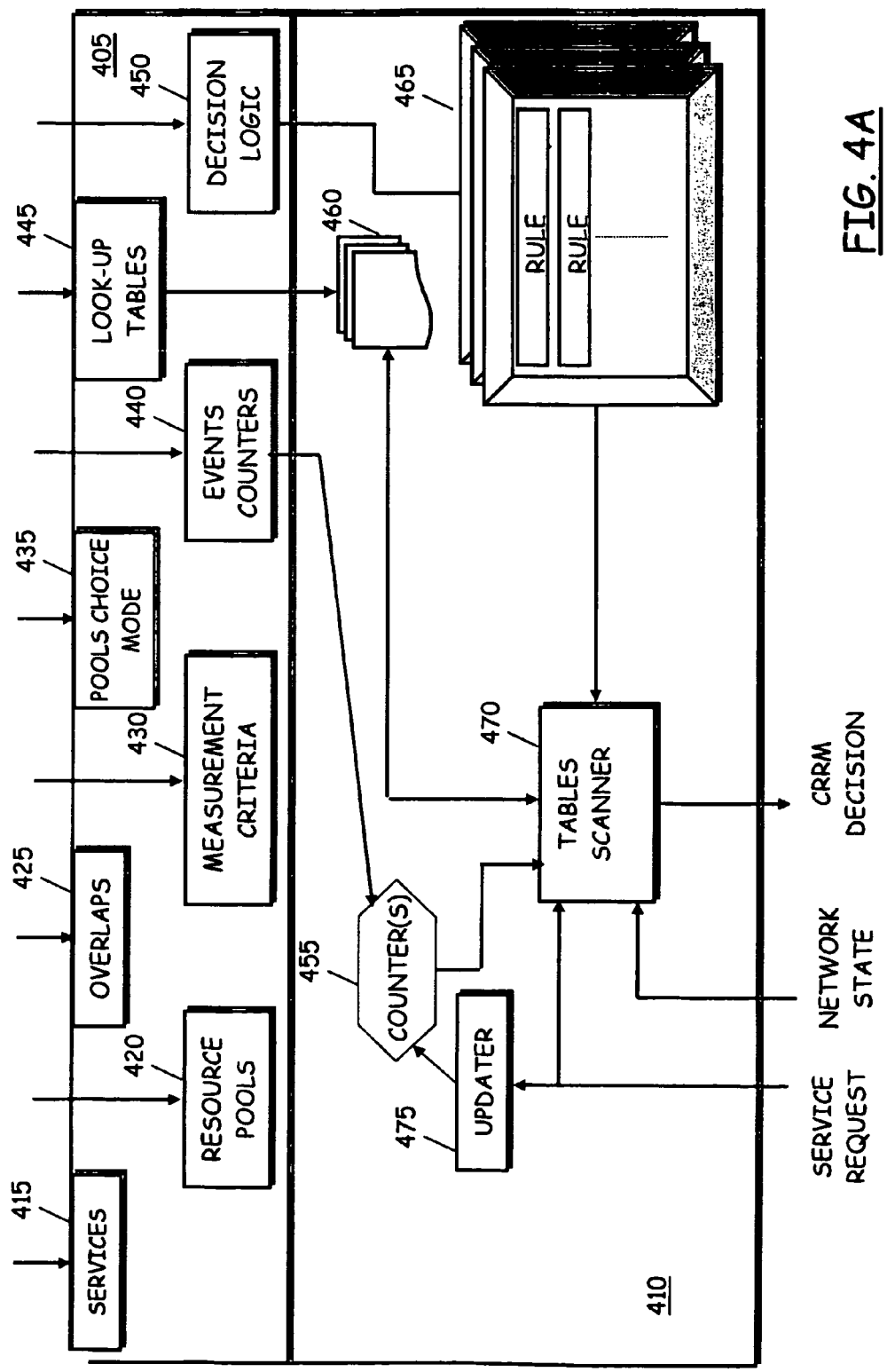
FIG. 4A schematically shows, in terms of functional blocks, an illustrative structure of a system according to an embodiment of the present invention, adapted to enable configuring and then implementing customized CRRM algorithms.

A structure of an apparatus according to an embodiment of the present invention which is configured for implementing a custom-defined CRRM algorithm is schematically depicted in FIG. 4A in terms of functional modules; the apparatus may for example be the CRRM server 360, or the BSCs 325, the RNCs 335, the APCs 345, and in general any network equipment intended to implement CRRM policies; the depicted functional modules may for example be software modules of a software installed in, and executed by the network equipment that is intended to implement the CRMM policies. The configurable CRRM policy implementation apparatus comprises a CRRM algorithm configuration module 405 and a CRRM algorithm implementation module 410. The configuration module 405 includes a services configuration module 415, a pools of resources configuration module 420, a list of cells in overlap configuration module 425, a module 430 for the definition of measurements criteria to be used in the definition of the available pools of resources, a module 435 for the definition of the mode of determination (choice) of alternative pools of resources, a module 440 for the definition of events counters 455, a module 445 for the definition of look-up tables 460, a module 450 for the definition of a CRRM decision logic; the decision logic, in an embodiment of the present invention (described in detail later) may take the form of a set (e.g., one or more) of tables 465, an example of which will be described later. The CRRM algorithm implementation module 410 includes the counters 455, the look-up tables 460, the CRRM decision logic, for example implemented as the set of tables 465, and a CRRM decision logic tables scanner module 470, adapted to scan the CRRM decision logic set of tables 465 in response to events corresponding to received service requests. An event counter updater module 475 is also provided, adapted to selectively update the events counters 455 depending on the received events. According to the present invention, the CRRM algorithm configuration module 405, particularly the module 450 for the definition of a CRRM decision logic, and the CRRM algorithm implementation module 410, particularly the CRRM decision logic tables scanner module 470, are structured in such a way to manage decision logics that are structured as sets of one or more decision rules that have a homogeneous structure, as will be described in greater detail in the following.

The functions of the modules shown in FIG. 4A will be explained in the following in connection with the description of the operation of the configurable CRRM policy implementation apparatus.

Figure 4B:
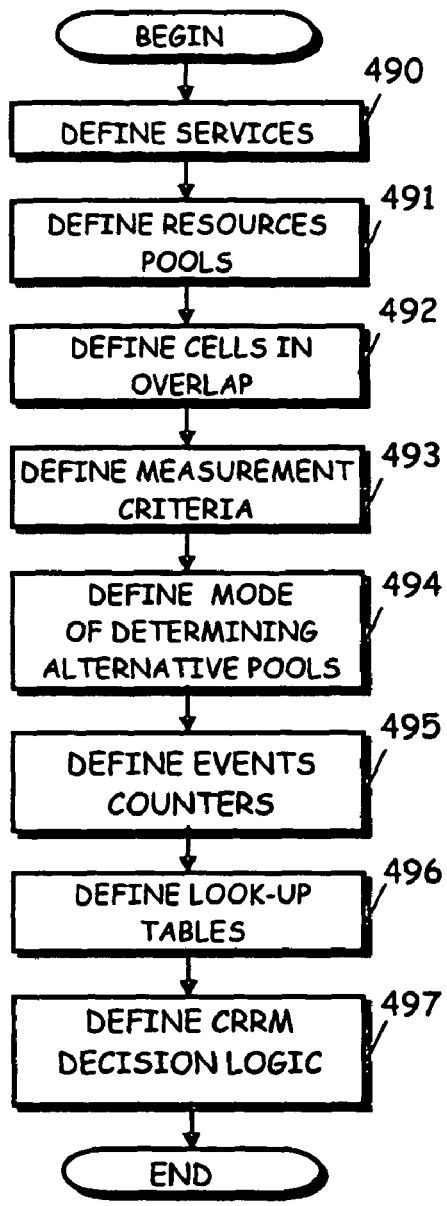
FIG. 4B shows, in terms of a schematic flowchart, the main steps of a phase of set-up for configuring a customized CRRM algorithm, according to an embodiment of the present invention.

According to an embodiment of the present invention, for configuring the network equipment so as to implement a desired CRRM algorithm, a set-up procedure is carried out. The main steps of the set-up procedure according to the illustrative invention embodiment considered herein are depicted in the schematic flowchart of FIG. 4B, and will be described in detail in the following.

Set-up Phase: Definition of the Services

In this step (block 490), the network operator (or, generally, any one who, on behalf of the network operator, is entrusted with the task of defining the CRRM policies to be implemented) defines which service requests have to be considered and managed by the CRRM algorithm to be implemented. This can be done for example by associating a unique identifier to each service which the network operator wants to be managed by the CRRM algorithm. For example, in case the CRRM algorithm has to allow the interworking between 2G and 3G systems, e.g. the interoperation between GERAN and the UTRAN, the service(s) to be managed by the CRRM algorithm should be identified, at the BSC and RNC level, by same or corresponding service identifiers.

From the BSC side, a service in the Packet-Switched (PS) domain can for example be identified by the Quality of Service (QoS) parameters defined in the Release 99 of the 3GPP specifications; referring to the 3GPP TS 23.107, these QoS parameters include for example a Traffic Class parameter, a Maximum Bitrate parameter, and so on. These QoS parameters are associated with the PDP (Packet Data Protocol) context set-up request (as known to those skilled in the art, a PDP context is a logical association that is created between a mobile terminal and a packet-based data network running across the GPRS or UMTS network and defining aspects like routing, billing, security, etc.). PDP contexts having a same or similar QoS profile may be grouped into a same PFC (Packet Flow Context). In the Release 99 of the GPRS standard, a SGSN (Serving GPRS Support Node, one of the entities of the GPRS system) is able to provide to the BSS (Base Station System, composed by a BSC and by the BTSs that are controlled by such BSC) information related to the ongoing user data transmission in terms of a BSS PFC. These are used to describe the QoS characteristics for data transmission for the mobile terminals, and are identified in terms of their PFI (Packet Flow Identity).

The QoS parameters associated with each PFC are then communicated to the BSC in aggregate form (ABQPs—Aggregate BSS QoS Parameters), as exemplified in the following table:

| ABQP for streaming service session (e.g. PFI = 10) | |
|---|---|
| Traffic Class | STREAMING |
| $GBR_{DL}$ | 32 kbps |
| $GBR_{UL}$ | 32 kbps | which is an example of the values of the ABQPs for a streaming service over GPRS/EGPRS ($GBR_{DL}$ and $GBR_{UL}$ stand for the Guaranteed Bit Rate in downlink and uplink, respectively).

Each PFC is identified by the PFI; according to an embodiment of the present invention, the definition of which services the CRRM algorithm is intended to manage in the BSC may be done exploiting the PFI, for example mapping the PFIs onto unique identifiers of the services, to be used by the CRRM algorithm being configured; the table below provides an example of definition of the services by mapping the respective unique identifiers ($ID_s \geq 1$) to the PFIs.

| $ID_s$ | Description | PFI | ABQP |
|---|---|---|---|
| 1 | Voice | 1 | {"CONVERSATIONAL", 12200, 12200} |
| 2 | Video streaming | 10 | {"STREAMING", 32000, 32000} |
| ... | | ... | |

From the RNC side, a service request is translated into a corresponding request for setting up a Radio Access Bearer (RAB) with a specific QoS. The different services can thus be univocally identified for example considering the following parameters associated with the RAB QoS profile:

{<class>, <transferDelay>, <UL_guaranteedBitRate>, <UL_maximumBitRate>, <DL_guaranteedBitRate>, <DL_maximumBitRate>} which are associated with the requested service and respectively represent the traffic class (which can be conversational, streaming, interactive or background), the maximum transfer delay of the data packets, the average bit rate to be guaranteed in uplink and downlink, the maximum bit rate in uplink and downlink. The table below provides an example of definition of the services' unique identifiers ($ID_s \geq 1$) in RNC, based on the RAB parameters:

| $ID_s$ | Description | RAB parameters |
|---|---|---|
| 1 | Voice | {"CONVERSATIONAL", 0., 12200, 12200, 12200, 12200} |
| 3 | Videocall | {"CONVERSATIONAL", 0., 64000, 64000, 64000, 64000} |
| 4 | Video streaming | {"STREAMING", 0., 16000, 16000, 128000, 128000} |
| ... | | ... |

It should be noted that the same or different identifiers can be used for similar services in BSC and in RNC. The identifier should be unique in the table referring to BSC and in the table referring to RNC. In the previous illustrative tables, for example, in each table there are not replicated identifiers, but in both the tables the voice service is identified by $ID_s=1$.

Set-up Phase: Definition of Pools of Resources for the RNCs and BSCs

In this step (block 491), the network operator defines, for each RNC and each BSC, entities referred to as "pools of resources". As mentioned in the foregoing, In general, for the purposes of the present invention, a pool of resources is a set of one or more resources belonging to the considered system, which may have homogeneous properties (the specific property(ies) may vary according to the network operator's needs), or simply that, for some reason, the network operator wants to consider as homogeneous. Examples of pools of resources that may be defined in the case herein considered of a multi-RAT mobile telephony network are provided in the foregoing. According to an embodiment of the present invention, a pool of resources is characterized by a list of cells that are associated therewith (as working assumption, it is assumed that each cell in the list of cells associated with the pool of resources belongs to one pool only, but this is not to be considered limitative).

The definition of the number of pools of resources and of the cells associated with each pool of resources is done by the network operator, and is susceptible of being modified. In this step of the set-up phase the network operator defines the number $N_p$ of pools of resources for the specific CRRM algorithm being configured, with $1 \leq N_p$. The table below provides an example of definition of pools of resources:

| $ID_p$ | Description |
|---|---|
| 1 | GSMTO1, GSMTO2, GSMTO3 |
| 2 | GSMTO4, GSMTO5, UMTSTO1 |
| ... | ... |
| $N_p - 1$ | UMTSTO2 |
| $N_p$ | UMTSTO3, GSMTO5 | where $ID_p=1, \ldots, N_p$ is the identifier of the generic pool of resources, and GSMTO1, GSMTO2, GSMTO3, GSMTO4, GSMTO5, UMTSTO1, UMTSTO2, UMTSTO3, GSMTO5 are labels of GSM or UMTS cells in the illustrative network of FIGS. 2 and 3.

Set-up Phase: Definition of Overlaps Between Cells

In this step (block 492), the network operator defines, for each cell, which other cells, belonging to pools of resources different from the one to which the considered cell belongs, are in overlap with the considered cell. As mentioned in the foregoing, the 3GPP specifications already allow associating to each cell different lists of adjacent cells (e.g., intra-frequency, inter-frequency, inter-RAT adjacency). These lists are normally used by the network for managing the user mobility and for guaranteeing services continuity when a user moves. According to an embodiment of the present invention, a more specific information is defined, to be exploited by the CRRM algorithm, consisting in the lists of overlaps defined in this set-up phase, that specify which cells, belonging to different pools of resources, cover a common area or portion of area: users that are located in areas served by different cells may for example use any one of the available pools of resources. Based on the definition of the cells' overlaps, the CRRM algorithm can choose, among the different possible alternatives, the pool of resources that allow optimizing the network operation.

The table below gives an example of definition of overlaps between the cells:

| Cell | List of cells of other pools in overlap |
|------|------------------------------------------|
| GSMTO1 | GSMTO4, UMTSTO2 |
| GSMTO4 | GSMTO1, UMTSTO2 |
| ... | ... | where it has been assumed by way of example that a GSM cell GSMTO1 is in overlap with the GSM cell GSMTO4 and with the UMTS cell UMTSTO2, and the GSM cell GSMTO4 is in overlap with the GSM cell GSMTO1 and with the UMTS cell UMTSTO2.

Set-up Phase: Definition of the Measurement Criteria

In a way similar to what provided for by the specifications (3GPP TS 25.331 and TS 05.08) in respect of the adjacent cells, in this step (block 493), the network operator defines, on a cell-by-cell basis and depending on the capabilities of the mobile terminals, which measurements have to be performed by the mobile terminals on the cells in overlap with the considered cell.

Set-up Phase: Definition of the Mode of Determination of Alternative Pools of Resources In this step (block 494), the network operator defines, for each cell, the modality by which the determination (choice) of the possible alternative pools of resources is made. In particular, according to an embodiment of the present invention, either one of two modes may be defined: a "blind" mode and a "measure-based" mode. In the "blind" mode, when a service is requested through a certain cell, the alternatives for the selection of the most appropriate pool of resources are determined uniquely from the list of cells that are in overlap with the considered cell. In the "measure-based" mode, the mobile terminals perform measures on the adjacent cells, and provides the results of the measures to the network; thus, when a service is requested to a certain cell, the alternatives for the selection of the most appropriate pool of resources are determined from the list of cells that are in overlap with the considered cell, taking into account only the cells that are suitable from a radio coverage point of view (according to the measurement performed by the mobile terminal).

In particular, in an embodiment of the present invention, the definition of the mode of determination of the alternative pools of resources is made on a cell-by-cell basis; the table below provides an example of definition:

| Cell | Mode |
|------|------|
| GSMTO1 | Blind |
| GSMTO4 | Measure based |
| ... | ... | where it has been assumed that for the GSM cell GSMTO1 the "blind" mode has been selected, whereas for the GSM cell GSMTO4 the "measure based" mode has been selected.

Set-up Phase: Definition of Event Counters

In this step (block 495) the network operator may define one or more counters of events corresponding to service requests; counting the events is useful to the CRRM algorithm for taking the most appropriate decision.

According to an embodiment of the present invention, a generic event, corresponding to a service request, may be characterized, within the network, by an n-uple of parameters comprised for example of the following elements:

| Element's name | Description |
|----------------|-------------|
| s | Identifier of the requested service ($1 \leq s$) |
| type | Request type: 0: new request, 1: HandOver (HO) |
| origin | Pool of resources to which the cell on which the terminal is camped belongs ($1 \leq$ origin $\leq N_p$) |
| dest(1) | Possibility of re-allocation on pool of resources 1 (True, False) |
| dest(2) | Possibility of re-allocation on pool of resources 2 (True, False) |
| ... | ... |
| dest($N_p - 1$) | Possibility of re-allocation on pool of resources $N_p - 1$ (True, False) |
| dest($N_p$) | Possibility of re-allocation on pool of resources $N_p$ (True, False) | wherein s denotes the requested service (by means of the unique identifier $ID_s$) defined as discussed in the foregoing); type specifies whether the service request is a new request or rather it is a request due to a HO from another cell; origin is an identifier ($ID_p=1, \ldots, N_p$, as discussed above) of the pool of resources to which the cell where the mobile terminal is camped at the time the service is requested belongs; dest(i) is a Boolean flag indicating, for the generic i-th pool of resources, whether or not that pool resources can be used in alternative to the pool of origin: according to the present invention, the value of this flag is assigned by the network based on the specified mode of determination of the alternative pools of resources (as discussed in the foregoing). In particular, the flag dest(i)=True for i=pool of the cell where the mobile terminal is camped at the time the service is requested.

The table below provides an example of event, under the assumption that $N_p=4$, that a new service request (i.e., not a handover) is received through a cell belonging to the pool of resources $ID_p=1$, and that the network evaluates that the service request may be satisfied also by the pools of resources $ID_p=3$ and $ID_p=4$, but not by the pool of resources $ID_p=2$:

| Element's name | Value | Comment |
|----------------|-------|---------|
| s | 2 | Service identifier |
| type | 0 | New request (not HO) |
| origin | 1 | The request came through a cell of the pool of resources number 1 |
| dest(1) | T | The pool of resources number 1 can be used for satisfying the request |
| dest(2) | F | The pool of resources number 2 cannot be used for satisfying the request |

-continued

| Element's name | Value | Comment |
|---|---|---|
| dest(3) | T | The pool of resources number 3 can be used for satisfying the request |
| dest(4) | T | The pool of resources number 4 can be used for satisfying the request |

Let $N_c$ be the number of the distinct events counters defined by the network operator, it is $0 \leq N_c$.

According to an embodiment of the present invention, the generic event counter may be defined to be of integer type or of real type.

Each event counter of integer type is associated with a corresponding event: the occurrence of such event causes the counter value to be incremented.

Real-type counters are defined as the ratio of two integer-type counters, specified by the network operator; therefore, each event counter of real type has associated therewith two counters of integer type, one for the numerator and the other for the denominator.

For each counter defined by the network operator, the network keeps track of the counter values for each cell (i.e., a generic event counter has multiple instances, one per each cell), and each event counter in a cell is incremented only for events related to that cell.

The generic counter, either of integer type or of real type, is identified by a respective counter identifier $ID_c$, where $ID_c \geq 1$ and $ID_c \leq N_c$.

Since the same $ID_c$ refers to many counters (one for each cell), the counters will be referenced in the following as:

| Variable | Description |
|---|---|
| $c_{IDc}[<cell>]$ | Value of the counter with identifier IDc in cell <cell> |
| $c_{IDc}[pool=ID_p]$ | Value of the counter with identifier IDc in a cell of the pool with identifier $ID_p$ |

It has to be noted that the event counter associated with a pool of resources (second row in the previous table) has to be interpreted as a compact notation to represent each of the instances of the event counter associated to the cells belonging to the pool of resources; in other words, it is not a unique counter associated to all the cells of the pool of resources, rather it is a plurality of counter instances.

Two types of counters are defined: integer-type counters and real-type counters.

In particular, integer-type counters are defined as exemplified in the following table:

| $ID_c$ | Event description (not including the origin field) |
|---|---|
| 1 | $s_1, type_1, dest(1)_1, \ldots, dest(N_p)_1$ |
| 2 | $s_2, type_2, dest(1)_2, \ldots, dest(N_p)_2$ |
| $\ldots$ | $\ldots$ |

It is observed that the origin field of the event is not taken explicitly into consideration because, as mentioned above, each event counter in a cell is incremented only for events related to that cell.

In the definition of an event counter, any field of the event description may be replaced by a wildcard, e.g. a "*", to specify that the field may take any value.

A generic event counter may also be associated with two or more different events (in such a case, in the illustrative table above, two or more rows will be provided for that counter, each row specifying a different event that causes the counter value to be altered, particularly incremented). Similarly, a same event may be associated with two or more different counters.

Real-type counters can be specified by the network operator, like in the illustrative table below:

| $ID_c$ | $ID_c$ numerator | $ID_c$ denominator |
|---|---|---|
| 3 | $ID_{c1}$ | $ID_{c1'}$ |
| 4 | $ID_{c2}$ | $ID_{c2'}$ |
| $\ldots$ | | |

It is to be noted that each counter with a specific identifier $ID_c$ can be either integer or real, not both integer and real at the same time; in other words, this means that the same identifier can not be present in both the tables (integer counters and real counters) at the same time.

By way of example, the following two tables are used to define three counters ($N_c=3$); the first table defines two integer-type counters with identifier $ID_c=1$ and $ID_c=2$ (the first counter is incremented whenever a service request with $ID_s=2$ or $ID_s=8$ occurs whereas the second counter is incremented whenever a service request with $ID_s=5$ occurs) and the second table defines one real-type counter with identifier $ID_c=3$ as the ratio between the first ($ID_c=1$) and the second counter ($ID_c=2$),

| $ID_c$ | Event description |
|---|---|
| 1 | 2, *, *, *, *, * |
| 1 | 8, *, *, *, *, * |
| 2 | 5, *, *, *, *, * |

| $ID_c$ | $ID_c$ numerator | $ID_c$ denominator |
|---|---|---|
| 3 | 1 | 2 |

Set-up Phase: Definition of Look-up Tables

In this step (block 496), the network operator may define one or more look-up tables, in each of which a predetermined number (e.g., 256) of, e.g., real values may be inserted. The generic look-up table is identified by a unique identifier $ID_l$, with $1 \leq ID_l \leq N_l$ where $N_l$ is the number of lookup tables defined by the network operator, the generic element of the generic look-up table is identified by an index j (with, in the considered example, $0 \leq j \leq 255$).

The table below gives an example of a look-up table that may be defined according to an embodiment of the present invention:

| Look-up Table $ID_l = 2$ | |
|---|---|
| Index | Value |
| 0 | 3.5 |
| 1 | 99 |
| $\ldots$ | |
| 255 | 6.67 |

The look-up tables may be used by the CRRM algorithm in the process of deciding which resource devote to satisfy a service request, as will be described in greater detail later. A generic look-up table with $ID_l$=i may be accessed by the following invocation:

lookup[i,j]

where i and j are integers or real numbers (in the latter case, they are truncated). If no look-up tables have been defined, the invocation returns 0.0. If I<1, the look-up table with $ID_l$=1 is accessed; if i>$N_l$, the look-up table with $ID_l$=$N_l$ is considered. If j<0, the look-up table element in position 0 is considered; if j>255, the element in position 255 is considered.

Set-up Phase: Definition of the CRRM Decision Logic (Policy)

In this step (block 497), the network operator defines the decision logic of the CRRM algorithm to be implemented.

According to the present invention, in order to allow flexible configurability of the CRRM policies that the apparatuses have to implement, decision logic structured as sets of one or more decision rules are managed. The decision rules are freely definable by the network operator, provided that a predetermined syntax is respected; as described in detail hereafter, the decision rule syntax is such that the generic decision rule includes:

a description of one or more events, i.e. one or more service requests to which the decision rule is intended to apply;
a description of the state of the system, e.g. of the network, an action to be undertaken in case the rule is satisfied.

The application of the decision logic calls for checking the decision rules, based on a comparison between a description of a received service request and the descriptions of the service requests specified in the decision rules, and a comparison between a description of the current state of the system at the time the service request is received and the descriptions of the state of the system included in the decision rules.

The radio resource controllers, namely the BSCs and the RNCs, in addition to the complete knowledge of the load state of the cells they directly manage, can also receive indications about the load state of the cells belonging to the alternative RAT. According to the 3GPP specifications (3GPP TS 25.423), the exchange of cell load values between the RNCs and the BSCs can take place exploiting a procedure called "Common Measurements" (over the Iur-g interface, if provided, or over the A interface and the Iu interface with the core network; in the latter case, the core network transfers in a transparent way the information that the UTRAN and the GERAN exchange).

In a multi-RAT, GERAN/UTRAN system, the quantities that the RNCs and the BSCs can exchange are all related to the cells' load. The specifications set forth the possibility that a parameter called "Cell Load" is estimated independently for the uplink and the downlink (possibly, the real-time traffic— "RT Load"—and the non-real-time traffic—"NRT Load"— may be treated independently). In particular, the value for the Cell Load can range from 0 to 100, defined as the percentage of the overall load supported by the generic cell in the generic instant with respect to the maximum planned cell capacity. By this convention, the Cell Load is a parameter independent from the specific RAT, so it can be used in a multi-vendor and/or multi-RAT environment (in the latter case, the proper equivalencies between the different RATs shall be respected, taking account of the proportions in terms of available radio resources and capacity of the different radio access networks).

In particular, the value for the RT Load can range from 0 to 100, defined as the percentage of the load generated by the traffic associated with real-time services with respect to the maximum planned cell capacity; the NRT Load indicates instead the cell load generated by the traffic associated with non-real-time services, and can for example take values "low", "medium", "high" and "overloaded".

The values of the cell load parameters are dynamic, thus, for a proper working of the CRRM algorithms, the measurements necessary for calculating them are repeated with a proper periodicity.

In other words, the state of the network is usually not known in a transparent way to all the network equipment; for example, an RNC has only a partial knowledge of the load status of cells not directly controlled by it: a BSC/RNC has a full knowledge of the load status of the cells it controls, but as far as the cells controlled by other BSCs/RNCs, its knowledge may be limited to the Cell Load.

According to an embodiment of the present invention, the state of the network is expressed by a set of state variables, as specified in the table below:

| Variable | Values | Description |
| --- | --- | --- |
| RTLU[<cell>] | Int 0 ... 100 | Cell Load in uplink for real-time services in the cell <cell> |
| RTLD[<cell>] | Int 0 ... 100 | Cell Load in downlink for real-time services in the cell <cell> |
| N[<cell>,$ID_s$] | Int | Number of ongoing connections for the service with identifier $ID_s$ in the cell <cell> |
| RTLU[pool=$ID_p$] | Int 0 ... 100 | Cell Load in uplink for real-time services in a cell of the pool of resources with identifier $ID_p$ |
| RTLD[pool=$ID_p$] | Int 0 ... 100 | Cell Load in downlink for real-time services in a cell of the pool of resources with identifier $ID_p$ |
| N[pool=$ID_p$,$ID_s$] | Int | Number of ongoing connections for the service with identifier $ID_s$ in a cell of the pool of resources with identifier $ID_p$ |

It has to be noted that the variables associated with a pool of resources (last three rows in the previous table, i.e. RTLU [pool=$ID_p$], RTLD[pool=$ID_p$] and N[pool=$ID_p$,$ID_s$]) have to be interpreted as a compact notation to represent single instances of the state variables, one for each cell belonging to the resource pool; they are not global variables associated to all the cells of the resource pool, as will be described in greater detail later.

Since, as mentioned, a BSC/RNC may not have full visibility of the state of cells controlled by different BSCs/ RNCs, considered the generic BSC/RNC, not all the state variables defined above will in general have a value attributed thereto; the situation that is in general encountered in the generic BSC/RNC X is given in the table below:

| Variable | Value | Condition |
| --- | --- | --- |
| RTLU[c] | Assigned | c ∈ X |
| RTLU[c] | Assigned | c ∉ X |

-continued

| Variable | Value | Condition |
| --- | --- | --- |
| RTLD[c] | Assigned | $c \in X$ |
| RTLD[c] | Assigned | $c \notin X$ |
| N[c,ID$_s$] | Assigned | $c \in X$ |
| N[c,ID$_s$] | Not Assigned (N.A.) | $c \notin X$ | where $c \in X$ stands for a cell c that is controlled by the BSC/RNC X, whereas $c \notin X$ stands for a cell that is not controlled by the BSC/RNC X, and $ID_s$ is the identifier of the generic service.

According to an embodiment of the present invention, the decision logic of the CRRM algorithm to be implemented is expressed in the form of a set of tables 465, wherein each table entry corresponds to a decision rule, which in turn corresponds to a certain CRRM action to be taken when a respective combination of event, counter values, network state applies.

Each table in the set of tables is identified through a respective table identifier $ID_t$, where $1 \leq ID_t \leq N_t$, being $N_t$ the number of the tables.

In particular, according to an embodiment of the present invention, the set of tables expressing the CRRM algorithm decision logic includes two different kinds of tables: a first kind of tables is referred to as "table for cells", and a second type of tables is referred to as "table for pools". A "table for cells" is used to specify CRRM rules at the level of the individual cells, whereas a "table for pools" is used to specify more general CRRM rules for which it is sufficient to consider pools of resources, being not necessary to consider the individual cells. For example, in order to implement a CRRM rule of the type "all the voice calls originated by the UMTS have to be diverted to the GSM", it is not necessary to consider the individual cells, being sufficient to consider GSM pools of resources and UMTS pools of resources (each network equipment that has to implement the CRRM algorithm, like the BSCs and the RNCs, will translate and apply the general rule expressed in terms of pool of resources to the specific cells involved). Using this two types of tables may simplify the definition of CRRM rules (otherwise, several tables of the first type would be necessary to specify a general CRRM rule); however, the adoption of this table structure is not per se limitative, and alternative structures are possible.

Figure 5:
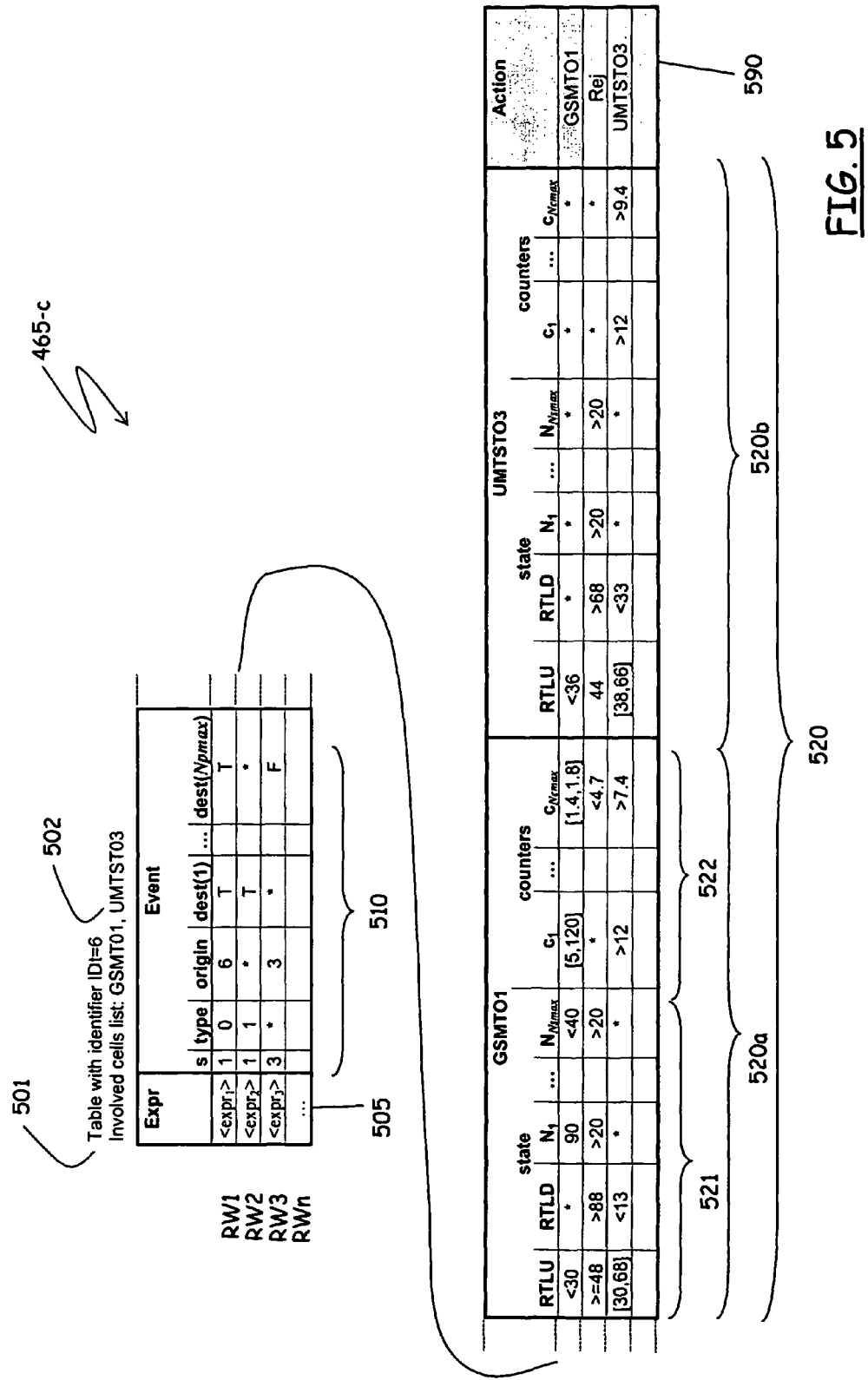
FIG. 5 schematically shows an illustrative table of a set of tables implementing the rules of a CRRM decision logic, in an embodiment of the present invention.
Figure 7:
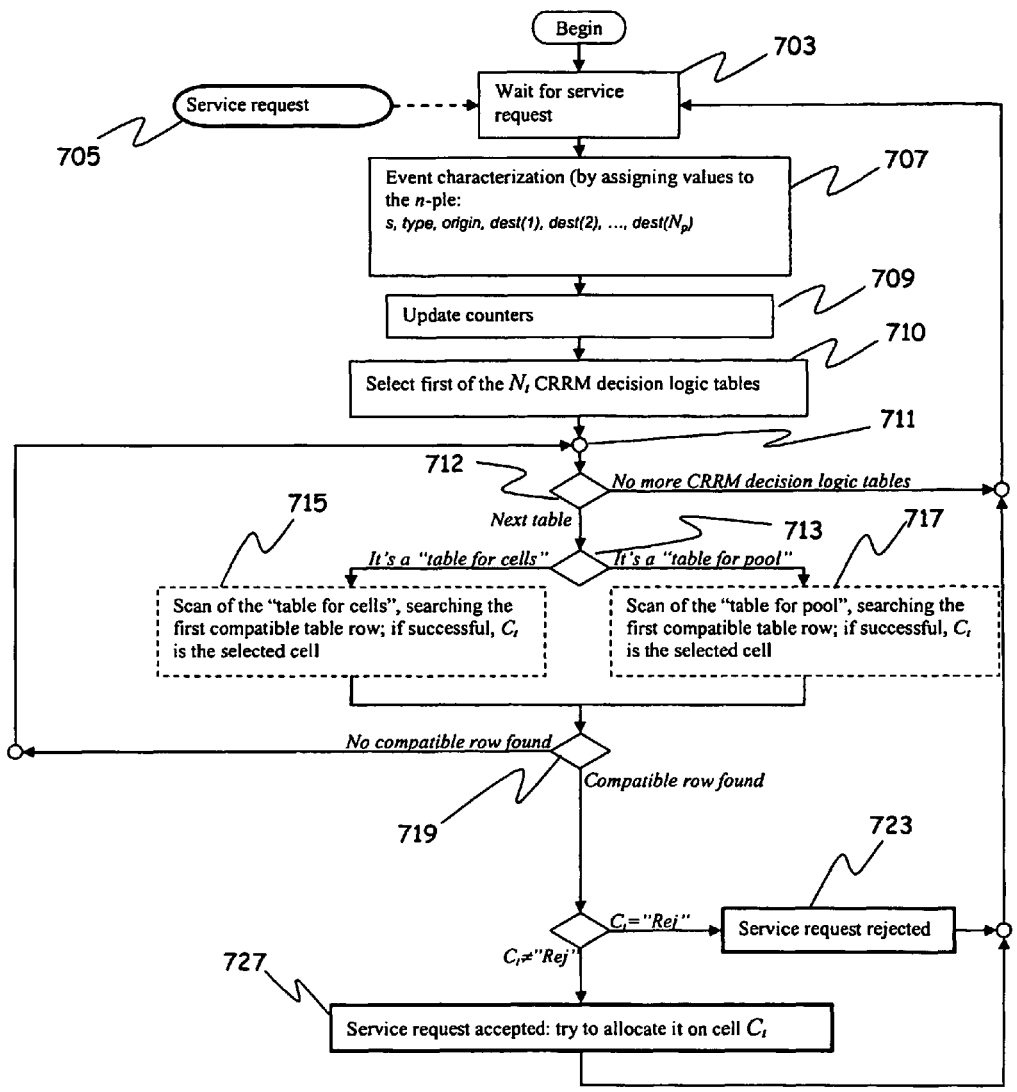
FIG. 7 shows, in terms of a schematic flowchart, the main flow of operation of the CRRM algorithm, in an embodiment of the present invention.

An illustrative "table for cells" is structured as depicted in FIG. 5, whereas FIG. 6 depicts the structure of an illustrative "table for pool".

With reference to FIG. 5, a "table for cells" 465-c includes table identifier $ID_t$ 501 and a list 502 of a number $L \geq 1$ of cells considered in that table (i.e., the cells to which the CRRM rules specified in the table pertain); in the example at issue, it is assumed that the table $ID_t=6$ relates to the cell GSMTO1 of the GSM network and the cell UMTSTO3 of the UMTS network.

The table includes a number n of table rows RW1, RW2, RW3, ..., RWn, and a number of table columns/groups of columns 505, 510, 520, and 590. In particular, the group of columns 520 includes a respective columns sub-group for each cell in the list 502, like the columns sub-groups 520a and 520b for the cell GSMTO1 and UMTSTO3, respectively (other sub-groups similar to the sub-groups 520a and 520b can be present if the list 502 contains other elements; FIG. 5 describes for simplicity the case of two elements only).

Considering the generic table row, which corresponds to a decision rule of the CRRM decision logic, the table element in the column 505 may contain an expression, with the semantic described below; the table elements in the group of columns 510 are adapted to contain an event description, i.e. a description of a service request to which the decision rule is intended to apply, according to the event definition provided above, i.e. the table elements in the group of columns 510 are adapted to contain values for the parameters s, type, origin, dest(1), ..., dest($N_p$) which characterize the events.

The group of columns 520 contain a description of the network state. The generic sub-group of columns 520a, 520b, related to a respective cell of the list 502, comprises a group of columns 521 and a group of columns 522.

The table elements in the group of columns 521 related to a certain cell in the list 502, all of integer type, are adapted to contain a description of the state of the corresponding cell, i.e. they are adapted to contain values for the above-defined state variables RTLU[<cell>], RTLD[<cell>] and N[<cell>,ID$_s$]. The table elements in the group of columns 522 related to a certain cell in the list 502, of integer or real type, are adapted to contain values of the counters defined, during the set-up phase, for the corresponding cell.

The table element in the column 590 is adapted to contain an identifier of a CRRM action to be undertaken; in particular, the CRRM action identifier may be an identifier "Rej", indicating that the service request has to be rejected, or it may be a label of a cell.

With reference to FIG. 6, a "table for pools" 465-p includes a table identifier $ID_t$ 601.

The table for pools has a number m of table rows RWP1, RWP2, RWP3, ..., RWPm, each one corresponding to a decision rule, and a number of table columns/groups of columns 605, 610, 621, 622, 640, 651, 652, and 690.

Considering the generic table row, similarly to the above-described "table for cells", the table element in the column 605 may contain an expression, with the semantic described below; the table elements in the group of columns 610 are adapted to contain an event description.

The table elements in the group of columns 621, all of integer type, are suitable to contain a description of the state of the origin cell where the service request was originated, i.e. they are suitable to contain values for the above-defined state variables RTLU[<cell>], RTLD[<cell>] and N[<cell>,ID$_s$] for the cell where the service request was originated.

The table elements in the group of columns 622, of integer or real type, are suitable to contain values of the counters defined, during the set-up phase, in respect of the origin cell where the service request was originated.

The table element in the column 640 is suitable to contain an identifier of a pool of resources.

The table elements in the group of columns 651, all of integer type, are suitable to contain a description of the state of a generic cell belonging to the pool specified in column 640, i.e. suitable to contain values for the state variables RTLU[<cell>], RTLD[<cell>] and N[<cell>,ID$_s$] for a generic cell of the pool specified in column 640.

The table elements in the group of columns 652, of integer or real type, are suitable to contain predetermined values of event counters defined during the set-up phase, which in operation have to match with the values of the event counters defined for the generic cell of the pool specified in column 640.

The table element in the column 690 is suitable to contain an identifier of a CRRM action to be undertaken; in particular, the CRRM action identifier can be either "Rej" (indicating that the service request has to be rejected), or an integer value being the identifier of a pool of resources.

In particular, in both the tables the table elements of integer type (int) or of real type (real), in addition to taking specific values, may also take the following values:
* indicates any value
<n indicates any value lower than a number n
≦n indicates any value lower or equal to a number n
>n indicates any value greater than a number n
]m,n[ indicates any value comprised between the numbers m and n (extremes excluded)
[m,n] indicates any value comprised between the numbers m and n (extremes included)
[m,n[ indicates any value comprised between the numbers m and n (excluded the extreme n)
]m,n] indicates any value comprised between the numbers m and n (excluded the extreme m)

The values of the table elements of Boolean type (type bool) may take, in addition to specific values (True, False), also the value "*", to indicate any value.

The table elements in the column 505 of the generic "table for cells" or in the column 605 of the generic "table for pools" are as mentioned adapted to contain an expression (type expr), that may be defined in the way below:
expr
    operand
    expr operator expr
    lookup[expr,exp]
    !expr
    (expr)
where:
!expr denotes the logic negation;
(expr) means that the syntax of an expression may include an expression in parenthesis;
operator denotes:
    + (sum or logic OR)
    * (multiplication or logic AND)
    −
    / (division of real numbers)
    >
    >=
    <
    <=
    =
    < >(meaning "different")
operand may be:
    real_number
    integer_number
    variable
    T (Boolean value True, treated as 1 in evaluation of expressions)
    F (Boolean value False, treated as 0 in evaluation of expressions)
variable may be:
    s
    type
    origin
    dest
    cont
    state
where s denotes a service identifier, type denotes the type of service request (0 for new call or 1 for handover), origin denotes the pool of the cell where the service request was originated. dest may be:
    dest(1)
    ...
    dest($N_p$)

cont may be:
    $c_1$[<cell>]
    ...
    $c_{Nc}$[<cell>]
    $c_1$[origin]
    ...
    $c_{Nc}$[origin]
    $c_1$[pool]
    ...
    $c_{Nc}$[pool]
where $c_i$[origin] denotes the counter with identifier $ID_c$=i of the cell where the service request was originated and $c_i$[pool] denotes the counter with identifier $ID_c$=i of a cell of the pool specified in column 640.
state may be:
    RTLU[<cell>]
    RTLD[<cell>]
    N[<cell>, integer_number]
    RTLU[origin]
    RTLD[origin]
    N[origin, integer_number]
    RTLU[pool]
    RTLD[pool]
    N[pool, integer_number]
where RTLU[origin], RTLD[origin] and N[origin, integer_number] all refer to the cell where the service request was originated and RTLU [pool], RTLD[pool] and N[pool,integer_number] all refer to a cell of the pool specified in column 640.

According to an embodiment of the present invention, the result of a generic expression is a Boolean value.

An illustrative expression is:

$$(c_5[GSMTO1]<7.4)*(lookup[4,RTLU[UMTSTO3]]>=lookup[5,N[GSMTO1,2]])$$

which has to be construed as a logic AND between the following two conditions:
    the value of the event counter with $ID_c$=5 in cell GSMTO1 has to be lower than 7.4;
and
    the value assumed by the look-up table with $ID_t$=4, of the table element specified by the uplink cell load for cell UMTSTO3 has to be equal to or greater than the value assumed by the look-up table with $ID_t$=5, of the table element specified by the number of ongoing connections in the cell GSMTO1 in respect of the service with $ID_s$=2.

Another illustrative expression is:

$$(c_5[GSMTO1]<7.4)*(lookup[4,RTLU[pool]]>=lookup[5,N[origin,2]])$$

which has to be construed as a logic AND between the following two conditions:
    the value of the event counter with $ID_c$=5 in cell GSMTO1 has to be lower than 7.4;
and
    the value, in the look-up table with $ID_t$=4, of the table element specified by the cell load for a cell of the pool specified in column 640 has to be equal to or greater than the value, in the look-up with $ID_t$=5, of the table element specified by the number of ongoing connections in the cell where the service request was originated in respect of the service with $ID_s$=2.

Exploiting the set of tables 465 expressing the CRRM algorithm decision logic, in the way described in the following, the network entities (or, alternatively, the network entity) that implement the CRRM algorithm, e.g. the BSCs 325, the RNCs 335 and the APCs 345 (or, alternatively, the CRRM server 360), can take the appropriate decisions as to the way a generic service request has to be managed. In the shown example, an action value "Rej" means that the service request has to be blocked.

With the definition of the CRRM decision logic, the set-up phase ends.

Once the CRRM algorithm has been fully configured, in the way described above, it is ready to be implemented. The implementation of the CRRM algorithm (by the implementation module 410, exploiting the decision logic set of tables 465) is described below, making reference to the flowcharts of FIGS. 7, 8, 9A and 9B, in an embodiment of the present invention.

The CRRM algorithm waits (block 703) for the occurrence of an event corresponding to a service request in respect of a service which, in the set-up phase (block 490 in FIG. 4B), has been specified to be one of the services managed by the CRRM algorithm. Let it be assumed that a service request is received (event 705): the n-uple of parameters that, as described in the foregoing, characterize the occurred event is created, assigning proper values to each parameter (identifier s of the requested service, request type type, service request origin origin, etc.) (block 707). If, in the set-up phase (block 495), one or more counters have been defined whose value is affected by the occurrence of the event considered, the counters are updated (block 709).

Then, the tables scanner module 470 scans the set of CRRM decision logic tables 465 (in particular, as will be explained below, either a "table for cells" 465-c or a "table for pools" 465-p is scanned), until the first table and row (i.e., the first decision rule) is found that is compatible with the occurred event, as will be detailed in the following. The scanner module 470 selects the first one of the $N_t$ CRRM decision logic tables (block 710); the way the selected table is scanned depends on whether it is a "table for cells" (block 715) or a "table for pools" (717). If no compatible row is found in the selected table (the way compatibility of a row is assessed is described afterwards, in connection with FIGS. 8 and 9A, 9B), the next table is selected (block 719, and loop back to point 711), and the check is repeated; when there are no more tables (block 712), no CRRM policy can be applied to the request, and the algorithm goes back to block 703, waiting for the next occurrence of a service request; if instead a table is found wherein a compatible table row is found, the operations schematized by blocks 715 or 717 also include calculating the candidate cell $C_t$;

if the CRRM action resulting from the operations schematized by block 715 or block 717 is "Rej", then the service request has to be rejected (723) and the algorithm goes back to block 703, waiting for the next occurrence of a service request; otherwise the requested service is accepted, and an attempt is made to allocate it on the determined cell $C_t$ (block 727).

The operation flow jumps back to the wait-for-service request state (block 703).

Figure 8:
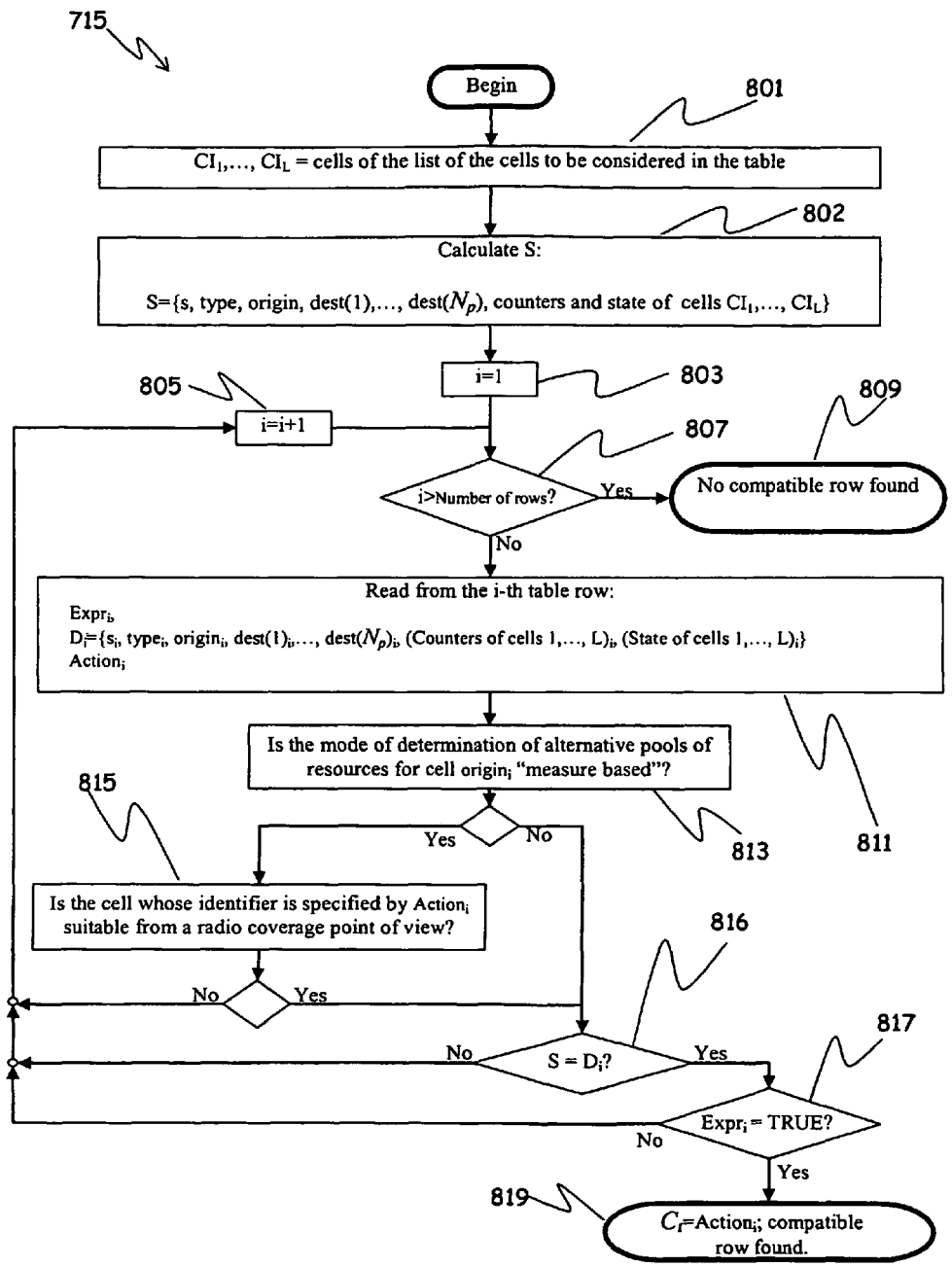
FIG. 8 shows, in terms of a schematic flowchart, the main steps of an operation included in the flowchart of FIG. 7 of scanning the CRRM decision logic table of FIG. 5.

A method by which the tables scanner module 470 scans the "table for cells" 465-c of the CRRM decision logic set of tables 465 will be now described, making reference to the schematic flowchart of FIG. 8.

Firstly, the involved cells list 502 specifying the cells involved in the "table for cells" being scanned is read (block 801); let $Cl_1, \ldots, Cl_L$ be the L cells of the list 502 (in the example of FIG. 5, $Cl_1$=GSMTO1 and $Cl_2$=UMTSTO3).

A vector variable S is calculated (block 802) based on the event characterization (the n-uple of parameters s, type, origin, etc.), the counters and the state of all the cells $Cl_1, \ldots, Cl_L$ in the list 502:

$$S=\{s, \text{type}, \text{origin}, \text{dest}(1), \ldots, \text{dest}(N_p), \text{counters and state of cells } Cl_1, \ldots, Cl_L\}.$$

Thus, the vector variable S contains the description of the occurred event, the values of the counters and the state of the cells at the time the event occurred.

The "table for cells" 465-c is scanned row by row, starting from the first row; a row counter i may be used to track the scanning of the table rows; the row counter is initially set to, e.g., 1 (block 803), and it is increased, e.g. by 1, each time the scanning passes to the next row (block 805), until the last table row is scanned (decision block 807, exit branch Yes): in the latter case, no compatible table row is found (block 809).

For the generic table row being scanned, i.e. for the generic decision rule under evaluation, the tables scanner module 470 reads the values of the elements stored in the table at the selected row; the expression in the element in column 505 is put into a variable $\text{Expr}_i$, the action in the element in column 590 is assigned to a variable $\text{Action}_i$, and the values of the other elements are assigned to a vector variable $D_i$ (block 811):

$$D_i=\{s_i, \text{type}_i, \text{origin}_i, \text{dest}(1)_i, \ldots, \text{dest}(N_p)_i, (\text{Counters of cells } 1, \ldots, L)_i, (\text{State of cells } 1, \ldots, L)_i\}.$$

It is then checked if the mode of determination of the alternative pools of resources set in the set-up phase (block 494 in FIG. 4) for the origin cell $\text{origin}_i$ is "measure based" or "blind" (block 813); in case the mode is "blind", the process continues by checking whether the vector variables S and $D_i$ coincide (block 816); if instead the mode is "measure based", then it is also checked (block 815) if the cell whose identifier is specified by the value of the variable $\text{Action}_i$ is suitable, from a radio coverage point of view; if not, then the next row is considered (block 805).

If, as mentioned, the "blind" mode has been set, or, in case of "measure based" mode, the cell specified by the value of the variable $\text{Action}_i$ is suitable from the radio coverage viewpoint, it is checked if the two vector variables S and $D_i$ are equal. if not, then the next row is considered (block 805), otherwise the method continues by checking whether the element in column 505 of the selected table row contains an expression: in the affirmative case, the tables scanner module 470 computes the expression value (possibly, to do this the tables scanner module may access one or more of the look-up tables 460 that have been defined in the set-up phase).

The result of the calculated expression is then evaluated (block 817). If the result of the calculation of the expression contained in the element in column 505 is "False", the scanning proceeds with the next table row, otherwise (i.e., if the expression result is "True") a compatible row has been found and the content of the variable $\text{Action}_i$ is taken as the CRRM action to be undertaken (the value is assigned to a variable $C_t$ that is used to specify the action (block 819).

If, in the computation of the expression value, an exception or error is encountered, the scanning proceeds with the next table row (if any). Examples of exceptions that may be encountered are a division by zero, the reference, in the expression, to a non-existing cell, the reference to a network state variable to which a value has not been assigned; a condition different from "*" in the table element that corresponds to a network state variable to which a value has not been assigned. Preferably, all the encountered exceptions/errors are stored in a log file, so to allow the network operator to easily identifying and correcting possible errors in, e.g., the CRRM decision logic.

Figure 9A:
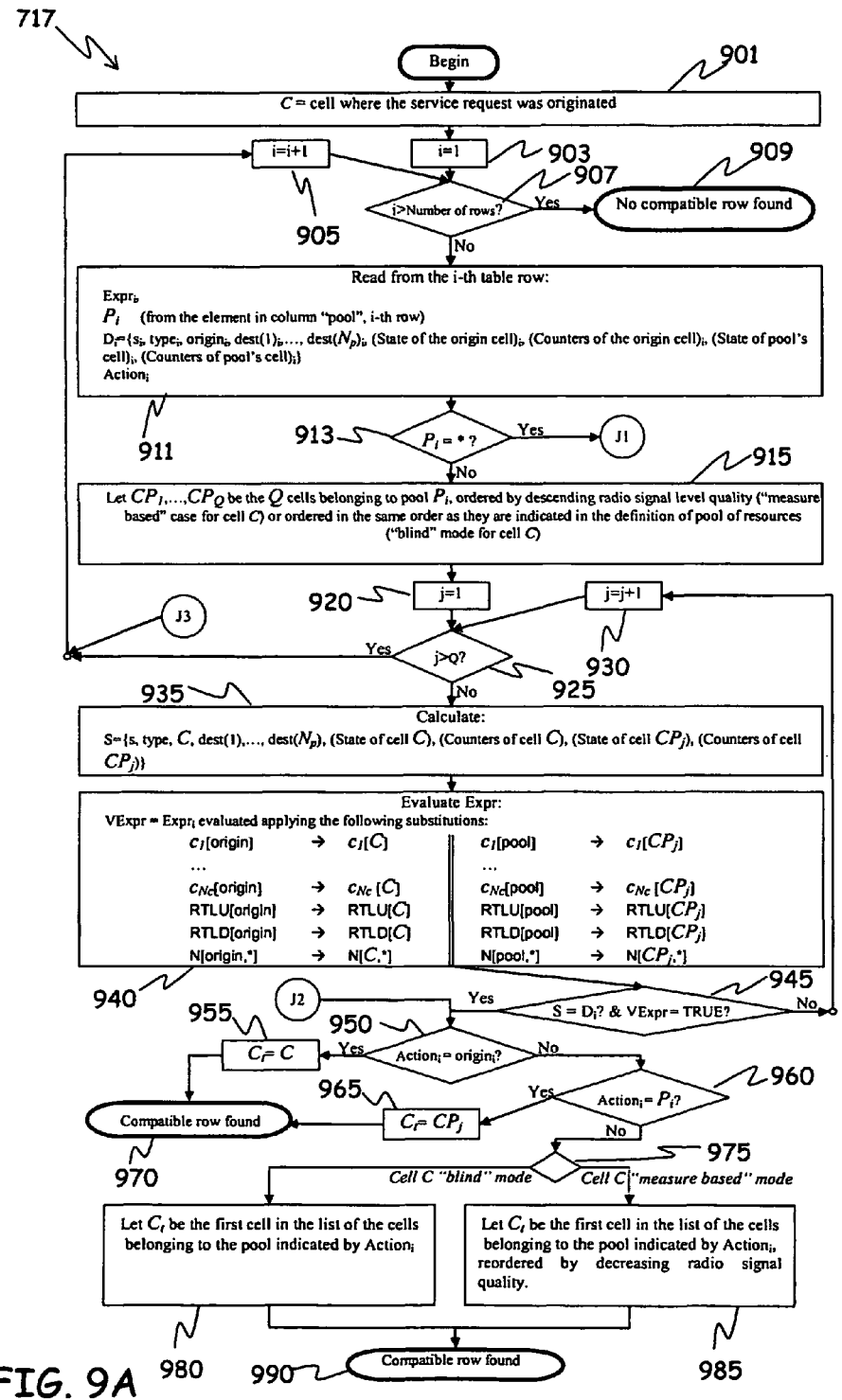
FIGS. 9A and 9B show, in terms of a schematic flowchart, the main steps of an operation included in the flowchart of FIG. 7 of scanning the CRRM decision logic table of FIG. 6, in an embodiment of the present invention.
Figure 9B:
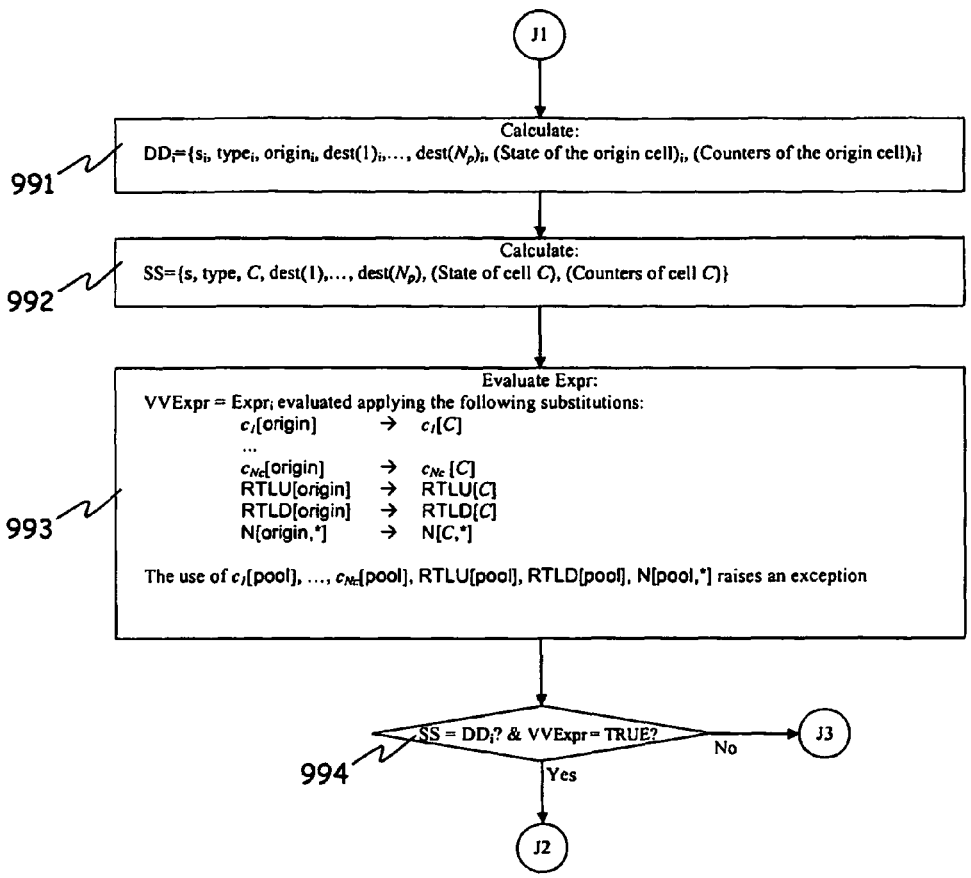

A method by which the tables scanner module 470 scans the generic "table for pool" 465-$p$ of the CRRM decision logic set of tables 465 will be now described, making reference to the schematic flowchart of FIGS. 9A and 9B.

A variable C is used, and the variable C is assigned the value of the identifier of the origin cell where the service request was originated (block 901).

The "table for pools" is scanned row by row, starting for example from the first row, i.e. from the first decision rule of the table; a row counter i may be used to track the scanning of the table rows; the row counter is initially set to, e.g., 1 (block 903), and it is increased, e.g. by 1, each time the scanning passes to the next row (block 905), until the last table row is scanned (decision block 907, exit branch Yes): in the latter case, no compatible table row is found (block 909).

For the generic table row being scanned, the tables scanner module 470 reads the values of the elements stored in the table at the selected row and assigns them (block 911) to a variable $Expr_i$ (taking the content read from the element in column 605), to a variable $P_i$ (taking the content read from the element in column 640), to a variable $Action_i$ (taking the content read from the element in column 690); the content of the remaining elements of the row is assigned to a vector variable $D_i$:

$D_i = \{s_i, type_i, origin_i, dest(1)_i, \ldots, dest(N_p)_i, (State\ of\ the\ origin\ cell)_i, (Counters\ of\ the\ origin\ cell)_i, (State\ of\ pool's\ cell)_i, (Counters\ of\ pool's\ cell)_i\}$.

In case the value $P_i =$"*" (block 913) the algorithm jumps (jumper J1) to a routine that will be described later on in connection with FIG. 9B, otherwise the Q cells belonging to the pool $P_i$ specified in the element in column 640 are then either reordered by descending radio signal level quality (in the case the "measure based" mode was set for the origin cell in the set-up phase) or they are kept in the same order as they are indicated in the definition of pool of resources (in the case the "blind" mode was selected for the origin cell). The names of the cells ordered as described are assigned to variables $CP_1, \ldots, CP_Q$ (block 915).

The cells specified by the variables $CP_1, \ldots, CP_Q$ are scanned one by one, starting from the cell $CP_1$; a row counter j may be used to track the scanning of the cells; the row counter is initially set to, e.g., 1 (block 920), and it is increased, e.g. by 1, each time the scanning passes to the next cell (block 930), until the last cell is scanned (decision block 925, exit branch Yes): in the latter case, a new table row has to be considered (block 905).

For the generic cell $CP_j$ being scanned, the tables scanner module 470 calculates a vector variable S (block 935) based on the occurred event characterization, excluding the origin field (i.e., the parameters considered are s, type, dest(1), ..., dest($N_p$)), on the current values of the counters and the states of the cells C (i.e. the origin cell) and $CP_j$ $S = \{s, type, C, dest(1), \ldots, dest(N_{pmax}), (State\ of\ cell\ C), (Counters\ of\ cell\ C), (State\ of\ cell\ CP_j), (Counters\ of\ cell\ CP_j)\}$.

A value VExpr is also calculated, applying to the expression contained in the element in column 605) the following substitutions (block 940):

| | | | | |
|---|---|---|---|---|
| $c_1$[origin] | → | $c_1$[C] | $c_1$[pool] | → | $c_1$[$CP_j$] |
| ... | | | ... | | |
| $c_{Nc}$[origin] | → | $c_{Nc}$[C] | $c_{Nc}$[pool] | → | $c_{Nc}$[$CP_j$] |
| RTLU[origin] | → | RTLU[C] | RTLU[pool] | → | RTLU[$CP_j$] |
| RTLD[origin] | → | RTLD[C] | RTLD[pool] | → | RTLD[$CP_j$] |
| N[origin,*] | → | N[C,*] | N[pool,*] | → | N[$CP_j$,*]. |

In other words, the expression is calculated in respect of the origin cell C and of the considered cell of the pool specified for the table row being scanned.

It is then checked if both $S = D_i$ and the value VExpr is True; if not (decision block 945, exit branch No), then next cell $CP_j$ is considered (back to block 930).

It is then checked if $Action_i = origin_i$; in the affirmative case (decision block 950, exit branch Yes), the variable $C_t$ takes the value of C (block 955) and the process ends with a compatible row found (block 970).

Otherwise, it is checked if $Action_i = P_i$; in the affirmative case (decision block 960, exit branch Yes), $C_t$ takes the value of $CP_j$ (block 965) and the process ends with a compatible row found (970).

If none of the two previous checks succeeds, there are two possibilities (block 975), depending on whether for the origin cell C the "blind" mode or the "measure based" mode were specified in the set-up phase; in the first case (block 980), $C_t$ takes the value of the first cell in the list of cells belonging to the pool indicated by $Action_i$; in the second case (block 985) $C_t$ takes the value of the first cell in the list of cells belonging to the pool indicated by $Action_i$ reordered by decreasing radio signal quality.

The process ends with a compatible row found (990).

The case of the element in the column 640 takes the value "*" (in block 913), i.e. of a row of the "table for pools" that specifies no particular pool of resources, is described in FIG. 9B:

Some elements of row i-th are used to calculate a vector variable $DD_i$ (block 991):

$DD_i = \{s_i, type_i, origin_i, dest(1)_i, \ldots, dest(N_p)_i, (State\ of\ the\ origin\ cell)_i, (Counters\ of\ the\ origin\ cell)_i\}$.

It can be seen that the vector variable $DD_i$ is the same as the vector variable $D_i$ of block 911, but it does not contain elements depending on (cells of) the pool $P_i$.

A vector variable SS is then calculated (block 992) in the following way:

$SS = \{s, type, C, dest(1), \ldots, dest(N_p), (State\ of\ cell\ C), (Counters\ of\ cell\ C)\}$.

It can be seen that the vector variable S is calculated in the same way as the vector variable S in block 935, but it does not contain elements depending on the pool $P_i$.

A value VVExpr is then evaluated (block 993), as follows:
VVExpr=$Expr_i$ contained in the element in column 605 evaluated applying the following substitutions:

| | | |
|---|---|---|
| $c_1$[origin] | → | $c_1$[C] |
| ... | | |
| $c_{Nc}$[origin] | → | $c_{Nc}$[C] |
| RTLU[origin] | → | RTLU[C] |
| RTLD[origin] | → | RTLD[C] |
| N[origin,*] | → | N[C,*] |

Thus, the value VVExpr is calculated in the same way as VExpr in block 940, but it does not contain references to the state of a cell of the pool, otherwise an exception is raised.

It is then checked if both $SS = DD_i$ and VVExpr is True (block 994); if not (decision block 994, exit branch No), then next mw is considered (back to block 905 through jumper J3); otherwise the process continues (through jumper J2) with the check of block 950.

Hereinafter, an example of application of the method and system described above will be presented.

Figure 10:
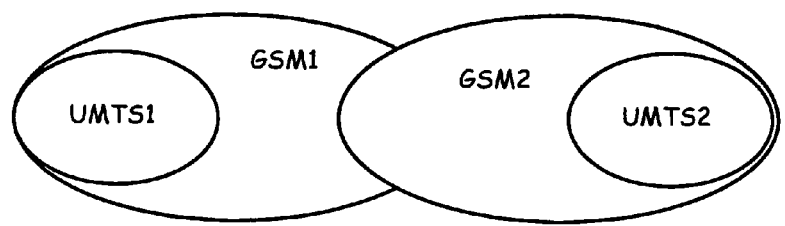
FIG. 10 depicts a schematic deployment of cells of a GSM and a UMTS networks used in an example provided in the description.

The scenario considered in the example to be presented is that of a mobile radio communications network capable of providing voice and data exchange services, wherein:
- the voice service is offered by both a GSM network and a UMTS network;
- the data exchange service is offered by the UMTS network;
- the GSM network includes two cells GSM1 and GSM2, and the UMTS network includes two cells UMTS1 and UMTS2, with respective coverage as depicted in FIG. 10;
- the cells GSM1 and GSM2 are controlled by a same BSC;
- the cells UMTS1 and UMTS2 are controlled by a same RNC.

It is assumed that the mapping of the UMTS capacity on the cell load variable defined in the foregoing is known: for example, the table below provides the cell load values in downlink versus the number of active voice and data users:

|  |  | Data |  |  |  |  |  |  |  |  |
|---|---|---|---|---|---|---|---|---|---|---|
|  |  | 0 | 1 | 2 | 3 | 4 | 5 | 6 | 7 | 8 | 9 |
| Voice | 0 | 0 | 11 | 23 | 34 | 46 | 57 | 69 | 80 | 92 | 100 |
|  | 1 | 7 | 17 | 29 | 40 | 51 | 61 | 74 | 85 | 100 |  |
|  | 2 | 14 | 24 | 35 | 46 | 56 | 66 | 79 | 90 |  |  |
|  | 3 | 21 | 31 | 42 | 52 | 62 | 71 | 84 | 95 |  |  |
|  | 4 | 28 | 38 | 48 | 58 | 67 | 76 | 89 | 100 |  |  |
|  | 5 | 35 | 45 | 55 | 64 | 73 | 80 | 94 |  |  |  |
|  | 6 | 42 | 52 | 61 | 70 | 78 | 85 | 100 |  |  |  |
|  | 7 | 50 | 58 | 67 | 76 | 83 | 90 |  |  |  |  |
|  | 8 | 57 | 65 | 74 | 82 | 89 | 95 |  |  |  |  |
|  | 9 | 64 | 72 | 80 | 88 | 94 | 100 |  |  |  |  |
|  | 10 | 71 | 79 | 87 | 94 | 100 |  |  |  |  |  |
|  | 11 | 78 | 86 | 93 | 100 |  |  |  |  |  |  |
|  | 12 | 85 | 93 | 100 |  |  |  |  |  |  |  |
|  | 13 | 92 | 100 |  |  |  |  |  |  |  |  |
|  | 14 | 100 |  |  |  |  |  |  |  |  |  |

The capacity of the GSM network is assumed to be 10 voice channels; the table below exemplifies the cell load values in downlink versus the number of active voice users:

| Voice users | Cell load |
|---|---|
| 0 | 0 |
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 100 |

The two tables above are useful to understand the maximum load allowed in the cells. The first table indicates the cell load given the number of voice and data calls in a UMTS cell. Since the cell load cannot be greater than 100, it is clear for example that if 10 voice calls are running, then no more than 4 data calls can be accepted. The second table refers to GSM where, in this example, only voice calls are possible.

As described above, in the set-up phase of the CRRM algorithm the network operator defines the network services to be subjected to the CRRM algorithm; in the present example, two real-time services are considered, namely a voice service and a data exchange service, as exemplified in the table below, which are identified as $ID_s=1$ and $ID_s=2$, respectively, and are characterized as discussed in the foregoing on the basis of the QoS parameters.

Also, in the set-up phase the pool of resources are defined; in the example considered, two pools of resources are assumed to have been defined, one grouping the GSM cells and the other grouping the UMTS cells:

| $ID_p$ | Description |
|---|---|
| 1 | UMTS1, UMTS2 |
| 2 | GSM1, GSM2 |

The step of definition of the cells' overlaps, based on the example of FIG. 9, gives:

| Cell | List of cells of other pools in overlap |
|---|---|
| GSM1 | UMTS1 |
| GSM2 | UMTS2 |
| UMTS1 | GSM1 |
| UMTS2 | GSM2 |

Concerning the definition of the criteria for the radio measurements on the neighbour cells, it is assumed that the network is configured in such a way that dual-mode (i.e. GSM and UMTS) mobile terminals located in a cell perform measures on the overlapped cell belonging to the other system.

This measurement configuration makes it possible to set the "measure-based" modality in the next step of the set-up phase: in the example considered, it is assumed that in the cells GSM1 and UMTS1 the "blind" modality is selected, whereas in the cells GSM2 and UMTS2 the "measure-based" modality is selected.

In the considered example, the events (service requests) are characterized by 5-uples of the form:

s, type, origin, dest(1), dest(2)

where s=1 identifies voice service requests, s=2 identifies data service requests, type=0 for a new request, type=1 for a request originating from a handover, origin=1 if the mobile terminal is camped on the UMTS network, origin=2 if the mobile terminal is camped on the GSM network, dest(1)=True if it is possible to assign the request to the UMTS network, dest(1)=False otherwise, and dest(2)=True if the service request can be assigned to the GSM, dest(2)=False otherwise.

It is also assumed that an events counter of integer type is defined for counting all the voice calls, and another events counter of integer type is defined for counting the voice calls that can be assigned to both the GSM and the UMTS networks. The two counters are thus defined in the following way:

| $ID_c$ | s | type | origin | dest(1) | dest(2) |
|---|---|---|---|---|---|
| 1 | 1 | * | * | * | * |
| 2 | 1 | * | * | T | T |

Furthermore, a real counter is assumed to have been defined, as a ratio between the two counters above:

| $ID_c$ | $ID_c$ numerator | $ID_c$ denominator |
|---|---|---|
| 3 | 2 | 1 |

A look-up table with $ID_t=1$ is also assumed to be defined in the set-up phase for specifying, in accordance with the illustrative capacity of the UMTS network given above, the maximum number of voice calls that can be accepted by a UMTS cell based on the number of ongoing data connections:

| Index | Value |
|---|---|
| 0 | 14 |
| 1 | 13 |
| 2 | 12 |
| 3 | 11 |
| 4 | 10 |
| 5 | 9 |
| 6 | 6 |
| 7 | 4 |
| 8 | 1 |
| 9 | 0 |
| 10 | 0 |
| 11 | 0 |
| ... | ... |
| 255 | 0 |

The state of the network is assumed to be described by the state variables listed in the following table, wherein for each variable it is specified whether it is visible to the RNC, to the BSC or to both of them:

| State variable | Visibile to RNC1 | Visibile to BSC1 |
|---|---|---|
| RTLU[UMTS1] | ✓ | ✓ |
| RTLD[UMTS1] | ✓ | ✓ |
| N[UMTS1,1] | ✓ | |
| N[UMTS1,2] | ✓ | |
| RTLU[UMTS2] | ✓ | ✓ |
| RTLD[UMTS2] | ✓ | ✓ |
| N[UMTS2,1] | ✓ | |
| N[UMTS2,2] | ✓ | |
| RTLU[GSM1] | ✓ | ✓ |
| RTLD[GSM1] | ✓ | ✓ |
| N[GSM1,1] | | ✓ |
| RTLU[GSM2] | ✓ | ✓ |
| RTLD[GSM2] | ✓ | ✓ |
| N[GSM2,1] | | ✓ |
| RTLU[pool=1] | ✓ | ✓ |
| RTLD[pool=1] | ✓ | ✓ |
| N[pool=1,1] | ✓ | |
| N[pool=1,2] | ✓ | |
| RTLU[pool=2] | ✓ | ✓ |
| RTLD[pool=2] | ✓ | ✓ |
| N[pool=2,1] | | ✓ |

It can be appreciated that all the state variables related to the real-time load are visible to both the RNC and the BSC; the state variables related to the number of active connections for the voice or data services are visible only to the controller of the relevant cell.

Figure 11:
FIG. 11 show a CRRM decision logic table used in said example.

The CRRM decision logic is assumed to be specified in the table of FIG. 11, with identifier $ID_t=1$; the table corresponds in principle to the table of FIG. 5.

It can be appreciated that:

Row 1 of the Table:
Specifies that service requests of the data type can be satisfied only by the UMTS network;

Rows 2 and 3 of the Table:
Specify that HO requests of voice services are kept on the RAT towards which they are being transferred by the HO;

Row 4 of the Table:
Specifies that a new request for a voice service that can be served only by the UMTS network is assigned to the UMTS network;

Row 5 of the Table:
Specifies that a new request for a voice service that can be served only by the GSM network is assigned to the GSM network;

Row 6 of the Table:
Specifies that a new request for a voice service received by the RNC, that can be served by both the UMTS network and the GSM network, is assigned to the GSM network (supposing that there is sufficient capacity for it);

Row 7 of the Table:
Specifies that if it is not possible to allocate a further voice call on the UMTS network, the service request is rejected; this check is performed exploiting the look-up table $ID_t=1$ defined above: the expression has the following meaning:

(Number of voice calls in the cell of the UMTS pool) ≤(maximum number of admissible voice calls when a number (N[pool,1]) of data calls are present in the cell of the UMTS pool)

Row 8 of the Table:
Specifies that if in the cell where the voice call request was originated counter $c_3>0.7$, then the call is accepted on the UMTS network Row 9 of the Table:
Specifies that otherwise the call is rejected Row 10 of the Table:
Specifies that a new voice service request received by the BSC, that can be served by both the GSM and the UMTS networks, is assigned to the GSM, if there is still room for it;

Row 11 of the Table:
Specifies that if it is not possible to allocate further voice calls on the UMTS network, the service request is rejected;

Row 12 of the Table:

Specifies that if in the cell where the voice call request was originated counter $c_3>0.7$, then the call is accepted on the UMTS network Row 13 of the Table:

Specifies that otherwise the call is rejected.

The operation of the CRRM algorithm, in the considered example, is described in the following.

Let it be assumed that a mobile terminal, connected to the cell UMTS1, requests to perform a new voice call; let it also be assumed that the terminal is dual-mode capable. The event is in this case characterized by:

| | |
|---|---|
| s=1 | (voice call) |
| type=0 | (new voice call, not HO) |
| origin=1 | (the terminal is connected to the UMTS network) |
| dest(1)=T | (the terminal might connect to the UMTS network) |
| dest(2)=T | (the terminal might connect to the GSM network) |

According to the method described in detail in the foregoing, the voice calls counter and the counter of the voice calls that can be handled by both the GSM and the UMTS networks are both incremented in cell UMTS1.

The rows of the CRRM decision logic table $ID_t=1$ are scanned by the table scanner module 470, looking for a row compatible with the occurred event. The scan is the one specific for "table for pool" as table $ID_t=1$ is of this type.

In particular:

Row 1 is found to be non-compatible, because the requested service is not a data service;

Rows 2 and 3 are found to be non-compatible because the service request is for a new call, not a HO;

Rows 4 and 5 are found to be non-compatible, because they relate to terminals that can use only one of the RATs, i.e. either the GERAN or the UTRAN;

Row 6 is characterised by a value different from "*" in the column "pool", therefore the pool 2 must be expanded in all its cells, namely cell GSM1 and GSM2. Since the origin cell (UMTS1) is characterised by "blind" mode, the cells of the pool are kept in the same order as in the definition of the pool, i.e. {GSM1, GSM2}.

S is calculated considering the first cell (GSM1) as the pool's cell: S={1, 0, UMTS1, T, T, (State of cell UMTS1), (Counters of cell UMTS1), (State of cell GSM1), (Counters of cell UMTS1)}. VExpr is True and the compatibility between S and $D_i$ must be checked. The part of the event is compatible; the remaining part is all "*" apart from column RTLD of the state of pool's cell (that refers to GSM1) where the condition is lower than or equal to 90. Assuming that the condition RTLD[GSM1]≦90 is satisfied, it is then successfully verified whether $Action_i=2$, therefore $C_f$=GSM1 and the scanning of the table ends with a compatible row found and cell GSM1 has to be used to accept the voice call request.

§§§§§

In an alternative embodiment of the invention, the decision logic is not defined in terms of a table, as described above, rather the network operator can input a decision algorithm implementing a desired CRRM policy. In particular, the algorithm may be specified as a compiled computer program code, generated from a source code written by the network operator. Also in this case, the decision logic is structured as a set of one or more decision rules, having the homogenous syntax described in the foregoing. The algorithm may be structured as one or more procedures, or functions with inputs and an output; each corresponding to a decision rule; the inputs to the function may be the characterization of the occurred event (for example, in terms of the n-uple of parameters described in the foregoing), and of the state of the network (as specified by the state variables described in the foregoing), including specific values for the counters defined during the set-up phase. The function output may be an identifier of an action to be taken.

For example, an interface in C (or similar) programming language may be provided for, of the type:

```
int CRRM(int s, int type, int origin, boolean* dest,
    int* integercounter, double* realcounter, tState* networkstate)
{
    // Code written by the network operator
    return ... // Returns the ID of an action to be taken
}
``` where tState* is a type of a data structure suitable to contain the state of the network.

The CRRM decision procedure or function is invoked each time an event occurs that necessitates the CRRM algorithm for deciding how it has to be handled (these events are specified in the set-up phase). Based on the output of the function, the network undertakes the corresponding action. Errors or exceptions encountered during the determination of the action to be taken may lead to default actions.

§§§§§

Thanks to the present invention, the network operator is given the possibility of defining and implementing the preferred CRRM policies that best fit the specific network context, possibly varying them in time, without the need of asking the producers of network equipment to customize them.

The present invention can be applied in general to any telecommunications network, either radio (i.e., wireless) or not, wherein, in order to satisfy service requests from users, network resources (e.g., radio communications resources) have to be assigned to the users, where the assigned network resources can be selected from among different pools of network resources, and the selection is made based on resource selection policies, implemented by algorithms that are executed by network equipment, that take into account the service request and the state of the network.

Even more generally, the present invention can be applied in any system wherein it is desired or useful to implement system resource management policies, specifying the way system resources are assigned to requesting entities when the latter request services to the system.

Although in the description it has always been assumed that the CRRM algorithm manages service requests from users, this is not to be construed limitatively: the service request may be triggered by the network itself, for example in order to offer a certain service to the users.

The present invention can be implemented in hardware or as a combination of hardware and software. Any programming language and any Graphical User Interface (GUI) may be used, particularly any language that can be interpreted by microprocessors included in the network equipment. The specific sets of instructions, as well as the number of variables used in the program, may differ, according to the specific implementation.

The present invention has been herein described making reference to an illustrative and non-limitative embodiment thereof. Those skilled in the art will recognize that several modifications can be made to the described embodiments, for example in order to satisfy contingent needs, as well as several other embodiments are possible, without departing from the scope of protection set forth in the appended claims.

The invention claimed is:

1. A radio resource management apparatus configured to implement radio resource management policies for the management of radio resources of a system, said radio resources being susceptible of being assigned to entities requesting communication services to the radio communication system, comprising:
   a configuration interface adapted to receive radio resource management configuration data from a user, said configuration data comprising radio resource management decision logic adapted to specify a radio resource management policy; and
   a radio resource management policy implementation unit responsive to communication service requests from the requesting entities and adapted to manage assignment of the radio resources of the radio communication system to the requesting entities based on the radio resource management decision logic,
   wherein said configuration interface is configured to receive, and said radio resource management policy implementation unit is configured to manage, the radio resource management decision logics structured as a set of one or more decision rules, each decision rule comprising:
   a description of at least one communication service request intended to be governed by said decision rule;
   a description of a radio communication state of the system in respect to which the decision rule is intended to apply; and
   action to be taken by the apparatus in case the decision rule applies.

2. The apparatus of claim 1, wherein said configuration data comprise a definition of at least two groups of the radio resources of the radio communication system.

3. The apparatus of claim 2, wherein said configuration data comprise a definition of types of communication service requests in respect to which the assignment of radio resources of the system belonging to either one of the at least two groups of radio resources of the radio communication system has to be managed by the apparatus.

4. The apparatus of claim 3, wherein said action to be taken by the apparatus in case the respective decision rule applies comprises an indication of whether a communication service request has to be assigned a resource of the system belonging to one or the other of the at least two groups of radio resources, or whether a communication service request has to be rejected.

5. The apparatus of claim 2, wherein said description of at least one communication service request comprises an indication of type of the requested communication service, an indication of a group of radio resources of the system to which the system radio resource through which the communication service request is received belongs, an indication of a possibility of re-allocating the communication service request to another group of radio resources of the system of said at least two groups of radio resources.

6. The apparatus of claim 5, wherein the radio resource management policy implementation unit is configured to manage assignment of the radio resources of the radio communication system in response to a received communication service request based on a comparison between a description of the received communication service request and the descriptions of the communication service requests in the at least one decision rule of a radio resource management decision logic received through said configuration interface.

7. The apparatus of claim 1, wherein the radio resource management policy implementation unit is configured to manage assignment of the radio resources of the radio communication system in response to a received communication service request based on a comparison between a description of a current state of the radio communication system at the time the communication service request is received and the descriptions of the state of the radio communication system in the at least one decision rule of a radio resource management decision logic received through said configuration interface.

8. The apparatus of claim 1, wherein said description of a state of the radio communication system in respect to which the decision rule is intended to apply comprises at least one count value of events corresponding to received communication service requests.

9. The apparatus of claim 8, wherein said configuration data comprise a definition of at least one event counter to be associated with specified events corresponding to communication service requests from the requesting entities, said at least one event counter being managed by the radio resource management policy implementation unit.

10. The apparatus of claim 9, wherein the radio resource management policy implementation unit is configured to manage the assignment of the radio resources of the system in response to a received communication service request based on a comparison between a current value of the at least one event counter and a count value specified in the description of the state of the radio communication system in the at least one decision rule.

11. The apparatus of claim 1, wherein said configuration data comprise at least one table of values, the at least one decision rule of a radio resource management decision logic received through the configuration interface comprising references to said at least one table, said radio resource management policy implementation unit configured to perform lookup in the at least one table based on the references in the at least one rule of the radio resource management decision logic.

12. The apparatus of claim 11, wherein said radio communication system is structured in cells, and said description of a state of the radio communication system comprises an indication of load of said cells.

13. The apparatus of claim 12, wherein said indication of cell load comprises:
   an indication of cell load in uplink for real-time services related to a generic one of the cells;
   an indication of cell load in downlink for real-time services related to the generic one of the cells; and
   an indication of a number of active connections for the generic service related to a generic one of the cells.

14. The apparatus of claim 12, wherein said configuration data comprise a definition of at least two groups of the radio resources of the radio communication system, and wherein said at least two groups of system resources are groups of cells.

15. The apparatus of claim 14, wherein said configuration data comprise, for each of said cells, a definition of a list of other cells in overlap therewith and belonging to a different group of system radio resources.

16. The apparatus of claim 15, wherein said configuration data comprise, for each of said cells, an indication of a modality of determination of an admissible alternative radio resource of a system susceptible of being used for satisfying the communication service request.

17. The apparatus of claim 16, wherein said indication of modality comprises an indication of whether the determination has to be based on radio measures performed by the requesting entities.

18. The apparatus of claim 12, wherein said configuration data comprises a definition of at least two groups of the radio resources of the radio communication system, said description of at least one communication service request comprises an indication of a type of the requested communication service, an indication of a group of radio resources of the system to which the system resource through which the communication service request is received belongs, an indication of a possibility of re-allocating the communication service request to another group of radio resources of the radio communication system of said at least two groups, and said description of at least one communication service request comprises an indication of the type of communication service request, said type of communication service request comprising an indication of whether it is a new request or a hand-over.

19. A method of implementing radio resource management policies for management of radio resources of a radio communication system, said radio resources configured to be assigned to entities requesting communication services to the radio communication system, comprising:

providing to a radio resource management apparatus, through a configuration interface thereof, radio resource management configuration data, said configuration data comprising a radio resource management decision logic configured to specify a radio resource management policy; and having the radio resource management apparatus, through a resource management policy implementation unit thereof, manage assignment of the radio resources of the radio communication system to the requesting entities in response to received communication service requests based on the radio resource management decision logic, wherein said radio resource management decision logic is structured as a set of one or more decision rules, each decision rule comprising:

a description of at least one communication service request intended to be governed by said decision rule;

a description of a state of the radio communication system in respect to which the decision rule is intended to apply; and action to be taken by the apparatus in case the decision rule applies.

* * * * *